(12) United States Patent
Nahas

(10) Patent No.: US 9,340,679 B2
(45) Date of Patent: May 17, 2016

(54) DECORATIVE ARTICLE CONTAINING AN EQUIPPED, COLOURED AND SINTERED ZIRCONIA PART

(75) Inventor: Nabil J Nahas, Serris (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 123 days.

(21) Appl. No.: 13/997,397

(22) PCT Filed: Dec. 22, 2011

(86) PCT No.: PCT/IB2011/055890
§ 371 (c)(1),
(2), (4) Date: Jul. 9, 2013

(87) PCT Pub. No.: WO2012/085875
PCT Pub. Date: Jun. 28, 2012

(65) Prior Publication Data
US 2013/0284065 A1 Oct. 31, 2013

(30) Foreign Application Priority Data
Dec. 22, 2010 (FR) .................................... 10 61019

(51) Int. Cl.
| | |
|---|---|
| C04B 35/48 | (2006.01) |
| C04B 35/00 | (2006.01) |
| C09D 1/00 | (2006.01) |
| C04B 35/119 | (2006.01) |
| C04B 35/488 | (2006.01) |
| C04B 35/626 | (2006.01) |

(52) U.S. Cl.
CPC ............... *C09D 1/00* (2013.01); *C04B 35/119* (2013.01); *C04B 35/4885* (2013.01); *C04B 35/6261* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3234* (2013.01); *C04B 2235/3239* (2013.01); *C04B 2235/3241* (2013.01); *C04B 2235/3243* (2013.01); *C04B 2235/3246* (2013.01); *C04B 2235/3248* (2013.01); *C04B 2235/3251* (2013.01); *C04B 2235/3258* (2013.01); *C04B 2235/3262* (2013.01); *C04B 2235/3268* (2013.01); *C04B 2235/3272* (2013.01); *C04B 2235/3274* (2013.01); *C04B 2235/3275* (2013.01); *C04B 2235/3279* (2013.01); *C04B 2235/3281* (2013.01); *C04B 2235/3282* (2013.01); *C04B 2235/3284* (2013.01); *C04B 2235/3293* (2013.01); *C04B 2235/3298* (2013.01); *C04B 2235/3427* (2013.01); *C04B 2235/443* (2013.01); *C04B 2235/5409* (2013.01); *C04B 2235/5436* (2013.01); *C04B 2235/5445* (2013.01); *C04B 2235/5463* (2013.01); *C04B 2235/656* (2013.01); *C04B 2235/6562* (2013.01); *C04B 2235/72* (2013.01); *C04B 2235/762* (2013.01); *C04B 2235/763* (2013.01); *C04B 2235/768* (2013.01); *C04B 2235/77* (2013.01); *C04B 2235/785* (2013.01); *C04B 2235/786* (2013.01); *C04B 2235/96* (2013.01); *C04B 2235/963* (2013.01); *C04B 2235/9661* (2013.01)

(58) Field of Classification Search
CPC .. C04B 35/119; C04B 35/484; C04B 35/486; C04B 35/488; C04B 35/4885
USPC ......................................... 501/103, 104, 105
See application file for complete search history.

(56) References Cited

U.S. PATENT DOCUMENTS

| | | | |
|---|---|---|---|
| 5,711,906 A | 1/1998 | Briod | |
| 5,854,157 A * | 12/1998 | Hwang et al. | .................. 501/104 |
| 7,247,588 B2 * | 7/2007 | Kwon et al. | .................. 501/105 |

(Continued)

FOREIGN PATENT DOCUMENTS

| | | |
|---|---|---|
| JP | A-7-291630 | 11/1995 |
| JP | A 2000-264639 | 9/2000 |

(Continued)

OTHER PUBLICATIONS

May 8, 2014 Office Action issued in Japanese Patent Application No. 2013-545616 (translated).
Dohnalova et al; "Synthesis and Characterization of LnFeO$_3$ Pigments;" Journal of Thermal Analysis and Calorimetry; Oct. 2008; vol. 91; No. 2; pp. 559-563.
Apr. 12, 2011 Search Report issued in French Patent Application No. FR 1061019 (with translation).
Apr. 12, 2011 Written Opinion issued in French Patent Application No. FR 1061019 (with translation).
Jun. 11, 2012 Search Report issued in International Patent Application No. PCT/IB2011/055890 (with translation).
Jun. 11, 2012 Written Opinion issued in International Patent Application No. PCT/IB2011/055890 (with translation).

*Primary Examiner* — Noah Wiese
(74) *Attorney, Agent, or Firm* — Oliff PLC

(57) ABSTRACT

Disclosed is a particulate mixture having the following chemical composition, in percentages by weight on the basis of the oxides: $ZrO_2$: $\geq 10.0\%$; $2\% < Al_2O_3 \leq 80\%$; 2 to 20.0% of an oxide chosen from $Y_2O_3$, $Sc_2O_3$, MgO, CaO, $CeO_2$, and mixtures thereof, the MgO+CaO content being less than 5.0%; 0 to 18.0% of an oxide chosen from ZnO, lanthanide oxides except for $CeO_2$, and mixtures thereof; less than 12.0% of other oxides. The particulate mixture also has a pigment made of a material chosen from oxide(s) of perovskite structure, oxides of spinel structure, oxides of hematite structure $E_2O_3$, the element E being selected from the group $G_E(1)$ consisting of the mixtures of aluminum and chromium, the mixtures of aluminum and manganese, and mixtures thereof, the oxides of rutile structure $FO_2$.

41 Claims, No Drawings

(56) References Cited

U.S. PATENT DOCUMENTS

| | | | |
|---|---|---|---|
| 2002/0034644 | A1 | 3/2002 | Swiler et al. |
| 2006/0175584 | A1* | 8/2006 | Kwon et al. ............... 252/520.2 |
| 2007/0182042 | A1 | 8/2007 | Ikushima et al. |
| 2007/0270304 | A1 | 11/2007 | Fujisaki |
| 2010/0316560 | A1 | 12/2010 | Labrincha Batista et al. |
| 2012/0121859 | A1* | 5/2012 | Nahas et al. .................. 428/148 |

FOREIGN PATENT DOCUMENTS

| | | |
|---|---|---|
| JP | A-2002-38048 | 2/2002 |
| JP | A 2004-59374 | 2/2004 |
| JP | A-2005-289721 | 10/2005 |
| JP | A 2005-306678 | 11/2005 |
| JP | A-2006-342036 | 12/2006 |
| JP | A-2007-308338 | 11/2007 |
| WO | WO 2010/024275 A1 | 3/2010 |

* cited by examiner

DECORATIVE ARTICLE CONTAINING AN EQUIPPED, COLOURED AND SINTERED ZIRCONIA PART

TECHNICAL FIELD

The invention relates to a particulate mixture, to a sintered part obtained from such a particulate mixture and to a process for manufacturing such a sintered part.

TECHNICAL BACKGROUND

Zirconia-based sintered parts are commonly used for the manufacture of decorative articles such as jewelry, watches, bracelets, brooches, tiepins, chains, handbags, telephones, items of furniture or household tools.

To obtain a color, a pigment may be added. For example, WO 2010/024 275 describes a stabilized zirconia product which may contain between 1% and 30% alumina, incorporating a pigment based on cobalt oxide and chromium oxide, nickel oxide or iron oxide. JP 2005/306 678 and JP 2004/059 374 provide other examples of pigments.

Alumina-zirconia products, in particular those with an alumina content of between 10% and 50%, are known as having good mechanical properties, especially in terms of hardness and mechanical strength.

However, a pigment added to an alumina-zirconia product generally has a tendency to become degraded on sintering of the alumina-zirconia due to the high sintering temperatures required, which may lead to a color change that is difficult to control.

Alumina-zirconia products intended to be decorative articles must also have good scratch resistance and impact strength, and also a good appearance with well developed and uniform colors. They should also be biocompatible, i.e. they should not contain elements that might be released and that might be hazardous to man.

There is an ongoing need for novel alumina-zirconia-based ceramic sintered parts which have these properties and for novel processes for manufacturing such parts.

One aim of the invention is at least partially to satisfy this need.

SUMMARY OF THE INVENTION

According to the invention, this aim is achieved by means of a particulate mixture having the following chemical composition, as mass percentages on the basis of the oxides:
zirconia $ZrO_2 \geq 10.0\%$;
alumina $Al_2O_3 \leq 80\%$;
2% to 20.0% of an oxide chosen from the group $G_S(1)$ formed by $Y_2O_3$, $Sc_2O_3$, MgO, CaO, $CeO_2$, and mixtures thereof, the total content of MgO and CaO being less than 5.0%;
0% to 18.0% of an oxide chosen from the group $G_S(2)$ formed by ZnO, lanthanide oxides with the exception of $CeO_2$, and mixtures thereof;
less than 12.0% of other oxides;
said oxide of the group $G_S(1)$ and/or said oxide of the group $G_S(2)$ and/or alumina possibly being replaced, totally or partly, with an equivalent amount of precursor(s) of these oxides, said particulate mixture comprising a pigment, in an amount of between 0.5% and 10.0%, the particles of said pigment comprising a material chosen from:
  oxide(s) of perovskite structure, optionally replaced, totally or partially, with an equivalent amount of precursor(s) of these oxides,
  oxides of spinel structure,
  oxides of hematite structure $E_2O_3$, the element E being chosen from the group $G_E(1)$ formed by mixtures of aluminum and chromium, mixtures of aluminum and manganese, and mixtures thereof,
  oxides of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and mixtures thereof,
  orthosilicates chosen from the group of zirconium praseodymium orthosilicates $(Zr,Pr)SiO_4$, zirconium vanadium orthosilicates $(Zr,V)SiO_4$, zirconium orthosilicates comprising iron oxide as inclusion, and mixtures thereof.

Preferably, the constituents of said oxide of perovskite, spinel, hematite, rutile or orthosilicate structure represent more than 98%, more than 99%, or even substantially 100% by mass of said material. Preferably, the remainder to 100% consists of impurities.

The alumina content may be less than or equal to 2%. Preferably, $Al_2O_3 > 2\%$.

The inventors have found that a particulate mixture according to the invention makes it possible to manufacture, by sintering, a colored alumina-zirconia product that is perfectly suitable for manufacturing decorative articles.

A particulate mixture according to the invention may also comprise one, or even more, of the following optional characteristics:
  the zirconia content is greater than 15%, preferably greater than 20%, or even greater than 30%, greater than 40%, greater than 50%, greater than 60%, or greater than 70%, as a mass percentage,
  the alumina content is greater than 5%, preferably greater than 10%, or even greater than 15%, greater than 20%, greater than 25%, greater than 30%, as a mass percentage,
  the total content of $ZrO_2+Y_2O_3+Sc_2O_3+MgO+CaO+CeO_2+Al_2O_3+ZnO+$the lanthanide oxides with the exception of $CeO_2$ is greater than 90%, or even greater than 95% by mass,
  the oxide of the group $G_S(1)$ is chosen from the group formed by $Y_2O_3$, $Sc_2O_3$ and mixtures thereof, and, preferably, the content of said oxide of the group $G_S(1)$ is less than 8% and preferably less than 6.5%,
  the oxide of the group $G_S(1)$ is chosen from the group formed by MgO, CaO and mixtures thereof, and, preferably, the content of said oxide of the group $G_S(1)$ is less than 4%,
  the oxide of the group $G_S(1)$ is $CeO_2$ and, preferably, the content of said oxide of the group $G_S(1)$ is greater than 10% and less than 15%,
  the oxide of the group $G_S(1)$ is chosen from the group formed by $Y_2O_3$, $CeO_2$ and mixtures thereof, and preferably respects the relationship $10\% \leq 3.Y_2O_3+CeO_2 \leq 20\%$,
  the oxide of the group $G_S(1)$ is $Y_2O_3$ and, preferably, its content is greater than 3%, preferably greater than 4% and/or less than 8%, preferably less than 6.5%,
  in one embodiment, the oxide of the group $G_S(1)$ is a zirconia stabilizer,
  the oxide of the group $G_S(1)$ is chosen from the group formed by $Y_2O_3$, $Sc_2O_3$ and mixtures thereof, and, preferably, the content of said oxide of the group $G_S(1)$ is less than 8%, preferably less than 6.5%, on the basis of the sum of $ZrO_2$, $Y_2O_3$, $Sc_2O_3$, MgO, CaO and $CeO_2$,

- the oxide of the group $G_S(1)$ is chosen from the group formed by MgO, CaO and mixtures thereof, and, preferably, the content of said oxide of the group $G_S(1)$ is less than 4%, on the basis of the sum of $ZrO_2$, $Y_2O_3$, $Sc_2O_3$, MgO, CaO and $CeO_2$,
- the oxide of the group $G_S(1)$ is $CeO_2$ and its content is greater than 10% and less than 15%, on the basis of the sum of $ZrO_2$, $Y_2O_3$, $Sc_2O_3$, MgO, CaO and $CeO_2$,
- the oxide of the group $G_S(1)$ is chosen from the group formed by $Y_2O_3$, $CeO_2$ and mixtures thereof, and preferably respects the relationship 10% $3.Y_2O_3+CeO_2$ on the basis of the sum of $ZrO_2$, $Y_2O_3$, $Sc_2O_3$, MgO, CaO and $CeO_2$,
- the zirconia stabilizer is $Y_2O_3$, i.e. the particulate mixture comprises only $Y_2O_3$ as zirconia stabilizer,
- the content of $Y_2O_3$ is greater than 3%, preferably greater than 4% and/or less than 8%, preferably less than 6.5%, on the basis of the sum of $ZrO_2$, $Y_2O_3$, $Sc_2O_3$, MgO, CaO and $CeO_2$,
- the particulate mixture comprises zirconia stabilized with said stabilizer, or a mixture of stabilized or non-stabilized zirconia particles, and of particles of said stabilizer, or a mixture of particles in which stabilized or non-stabilized zirconia and said stabilizer are intimately mixed. Such an intimate mixture may be obtained, for example, by coprecipitation or atomization, optionally consolidated with a heat treatment. In said mixtures, the stabilizer may be replaced with an equivalent amount of precursor(s) of this stabilizer,
- the alumina content is greater than 10%, preferably greater than 15% and less than 60%, preferably less than 50%, preferably less than 40%, more preferably less than 30%. In one particular embodiment, the alumina content is between 2% and 10%. In another particular embodiment, the alumina content is between 10% and 20%. Finally, in another particular embodiment, the alumina content is between 20% and 80%,
- the oxide of the group $G_S(2)$ is chosen from the group formed by ZnO and lanthanide oxides with the exception of $CeO_2$, and mixtures thereof, and, preferably, the content of said oxide of the group $G_S(2)$ is less than 15%, preferably less than 10%, preferably less than 8%, preferably less than 5%,
- the oxide of the group $G_S(2)$ is $La_2O_3$, and, preferably, its content is less than 15%, preferably less than 10%, preferably less than 8%, preferably less than 5%, and/or preferably greater than 0.5%,
- in one embodiment, the oxide of the group $G_S(2)$ is an alumina stabilizer,
- the oxide of the group $G_S(2)$ is chosen from the group formed by ZnO and lanthanide oxides with the exception of $CeO_2$, and mixtures thereof, and, preferably, the content of said oxide of the group $G_S(2)$ is less than 15%, preferably less than 10%, preferably less than 8%, preferably less than 5%, on the basis of the sum of $Al_2O_3$, ZnO and the lanthanide oxides with the exception of $CeO_2$,
- the oxide of the group $G_S(2)$ is $La_2O_3$, and, preferably, its content is less than 15%, preferably less than 10%, preferably less than 8%, preferably less than 5%, and/or preferably greater than 0.5%, on the basis of the sum of $Al_2O_3$, ZnO and the lanthanide oxides with the exception of $CeO_2$,
- the alumina stabilizer is $La_2O_3$, i.e. the particulate mixture comprises only $La_2O_3$ as alumina stabilizer,
- the particulate mixture comprises alumina stabilized with said stabilizer, or a mixture of stabilized or non-stabilized alumina particles and of particles of said stabilizer, or a mixture of particles in which stabilized or non-stabilized alumina and said stabilizer are intimately mixed. Such an intimate mixture may be obtained, for example, by coprecipitation or atomization, optionally consolidated with a heat treatment. In said mixtures, the stabilizer may be replaced with an equivalent amount of precursor(s) of this stabilizer,
- in one embodiment, the particulate mixture comprises alumina in the form of an alumina precursor, for instance an aluminum hydroxide, an aluminum salt,
- the alumina of the particulate mixture is alpha-alumina,
- in a preferred embodiment, the particulate mixture comprises particles in which the stabilized or non-stabilized zirconia and zirconia stabilizer are intimately mixed. Preferably, the particulate mixture comprises particles in which the stabilized or non-stabilized zirconia and zirconia stabilizer are intimately mixed. Such an intimate mixture may be obtained, for example, by coprecipitation or atomization, optionally consolidated with a heat treatment. In said mixtures, the stabilizer may be replaced with an equivalent amount of precursor(s) of this stabilizer,
- the particulate mixture does not comprise any zirconia stabilizer precursor,
- the particulate mixture has a median size of less than 10 μm, or even less than 5 μm, or even less than 3 μm, or even less than 1 μm and/or preferably greater than 0.05 μm. The median size of the particulate mixture is adapted to the forming process used to manufacture the sintered part,
- the powder consisting of pigment particles has a median size of less than 5 μm, preferably less than 1 μm, preferably less than 0.5 μm,
- the pigment content is greater than 3%, preferably greater than 4%, preferably greater than 5% and/or less than 8%, as a mass percentage on the basis of the particulate mixture,
- the particulate mixture does not contain any pigment containing the element aluminum,
- the oxides represent more than 98%, more than 99%, or even substantially 100% of the mass of the particulate mixture.

In a first embodiment, the pigment is made of an oxide of perovskite structure $ABO_3$ and the particulate mixture according to the invention may also comprise one, or even more, of the following optional characteristics:

- the element A at the site A of the perovskite structure is chosen from the group $G_A(1)$ formed by calcium Ca, strontium Sr, barium Ba, lanthanum La, praseodymium Pr, neodymium Nd, bismuth Bi, cerium Ce, and mixtures thereof,
- preferably, A is chosen from the group $G_A(2)$ formed by lanthanum, praseodymium, neodymium, bismuth, cerium, and mixtures thereof,
- preferably, A is chosen from the group $G_A(3)$ formed by lanthanum,
- the element B at the site B of the perovskite structure is chosen from the group $G_B(1)$ formed by mixtures of cobalt and iron, mixtures of cobalt and manganese, mixtures of cobalt and chromium, mixtures of cobalt and nickel, mixtures of chromium and manganese, mixtures of chromium and nickel, mixtures of chromium and iron, mixtures of manganese and iron, mixtures of manganese and nickel, mixtures of nickel and iron, mixtures of cobalt and titanium, mixtures of cobalt and copper, cobalt, mixtures of chromium and titanium, mixtures of chromium and copper, mixtures of nickel and titanium, chromium, nickel, copper, iron, mixtures of nickel and copper, and mixtures thereof, preferably, the element B is chosen from the group $G_B(2)$ formed by mixtures of cobalt and iron, mixtures of cobalt and manganese, mixtures of chromium and manganese, mixtures of chromium and iron, mixtures of cobalt and chromium and iron, mixtures of cobalt and chromium and iron and manganese, mixtures of cobalt and iron and manganese, mixtures of cobalt and chromium, mixtures of cobalt and nickel, mixtures of cobalt and titanium, mixtures of cobalt and copper, cobalt, mixtures of chromium and nickel, mixtures of chromium and titanium, mixtures of chromium and copper, mixtures of chromium and iron and manganese, mixtures of nickel and iron, mixtures of nickel and manganese, mixtures of nickel and cobalt, mixtures of nickel and titanium, mixtures of nickel and cobalt and chromium, mixtures of nickel and cobalt and chromium and manganese, mixtures of nickel and chromium and manganese, chromium, nickel, copper, the perovskite content in the 0.5% to 10% of pigment made of oxide(s) of perovskite structure and/or of precursor(s) of such oxides is greater than 90%, preferably greater than 95%, preferably greater than 99%, preferably substantially 100%, in general, for a constant alumina content, in order to darken the color, the content of pigment made of oxide(s) of perovskite structure and/or of precursor(s) of such oxides is preferably greater than 3%, preferably greater than 4%, preferably greater than 5% and/or preferably less than 8%. Also generally, for a constant content of pigment made of oxide(s) of perovskite structure and/or of precursor(s) of such oxides, the alumina content is increased to lighten the color.

In a second embodiment, the pigment is made of an oxide of spinel structure $CD_2O_4$ or $D(C,D)O_4$ and the particulate mixture according to the invention may also comprise one, or even more, of the following optional characteristics:

the element C of the spinel structure is chosen from the group $G_D(1)$ formed by nickel Ni in a mole fraction of between 0 and 0.2 or in a mole fraction equal to 1, copper Cu in a mole fraction of between 0 and 0.2, iron Fe in a mole fraction of between 0.2 and 0.6 or in a mole fraction equal to 1, zinc Zn in a mole fraction of between 0 and 0.2 or in a mole fraction equal to 1, manganese Mn in a mole fraction of between 0 and 0.4, cobalt Co in a mole fraction of between 0 and 0.4 or in a mole fraction of between 0.4 and 1, tin Sn in a mole fraction of between 0 and 0.2 or in a mole fraction equal to 1, mixtures of zinc and iron, mixtures of iron and manganese, mixtures of zinc and manganese, mixtures of cobalt and zinc, and mixtures thereof, preferably, the element C is chosen from the group $G_D(2)$ formed by nickel Ni in a mole fraction of between 0 and 0.2 or in a mole fraction equal to 1, iron Fe in a mole fraction of between 0.2 and 0.6 or in a mole fraction equal to 1, zinc Zn in a mole fraction equal to 1, manganese Mn in a mole fraction of between 0 and 0.4, cobalt Co in a mole fraction of between 0 and 0.4 or in a mole fraction of between 0.4 and 1, tin Sn in a mole fraction of between 0 and 0.2 or in a mole fraction equal to 1, mixtures of zinc and iron, mixtures of iron and manganese, mixtures of zinc and manganese, mixtures of cobalt and zinc, and mixtures thereof, the element D of the spinel structure is chosen from the group $G_D(1)$ formed by manganese Mn in a mole fraction of between 0 and 0.4, iron Fe in a mole fraction of between 0 and 0.6 or in a mole fraction equal to 1 (i.e. D is the element Fe), chromium Cr in a mole fraction of between 0.2 and 0.6 and in a mole fraction equal to 1, aluminum Al in a mole fraction of between 0 and 1, titanium Ti in a mole fraction of between 0 and 1, cobalt in a mole fraction equal to 1, unless the element C is cobalt, mixtures of iron and chromium, mixtures of iron and chromium and manganese, mixtures of manganese and chromium, mixtures of aluminum and chromium, and mixtures thereof, preferably, the element D is chosen from the group $G_D(2)$ formed by manganese Mn in a mole fraction of between 0 and 0.4, iron Fe in a mole fraction of between 0.2 and 0.6 and in a mole fraction equal to 1, chromium Cr in a mole fraction of between 0 and 0.6 and in a mole fraction equal to 1, aluminum Al in a mole fraction equal to 1, titanium Ti in a mole fraction equal to 1, cobalt in a mole fraction equal to 1 unless the element C is cobalt, mixtures of iron and chromium, mixtures of iron and chromium and manganese, mixtures of manganese and chromium, mixtures of aluminum and chromium, and mixtures thereof, the spinel content in the 0.5% to 10% of pigment made of oxide(s) of spinel structure is greater than 90%, preferably greater than 95%, preferably greater than 99%, preferably substantially 100%, in general, for a constant alumina content, in order to darken the color, the content of pigment made of oxide(s) of spinel structure is preferably greater than 3%, preferably greater than 4%, preferably greater than 5% and/or preferably less than 8%. Also generally, for a constant content of pigment made of oxide(s) of spinel structure, the alumina content is increased to lighten the color.

In a third embodiment, the pigment is made of an oxide of hematite structure $E_2O_3$, the element E being chosen from the group $G_E(1)$ formed by mixtures of aluminum and chromium, mixtures of aluminum and manganese, and mixtures thereof, and the particulate mixture according to the invention may also comprise one, or even more, of the following optional characteristics:

the hematite content in the 0.5% to 10% of pigment made of oxide(s) of hematite structure is greater than 90%, preferably greater than 95%, preferably greater than 99%, preferably substantially 100%, in general, for a constant alumina content, in order to darken the color, the content of pigment made of oxide(s) of hematite structure is preferably greater than 3%, preferably greater than 4%, preferably greater than 5% and/or preferably less than 8%. Also generally, for a content of pigment made of oxide(s) of hematite structure, the alumina content is increased to lighten the color.

In a fourth embodiment, the pigment is made of an oxide of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and mixtures thereof, and the particulate mixture according to the invention may also comprise one, or even more, of the following optional characteristics:

the rutile content in the 0.5% to 10% of pigment made of oxide(s) of rutile structure is greater than 90%, preferably greater than 95%, preferably greater than 99%, preferably substantially 100%, in general, for a constant alumina content, in order to darken the color, the content of pigment made of oxide(s) of rutile structure is preferably greater than 3%, preferably greater than 4%, preferably greater than 5% and/or preferably less than 8%. Also generally, for a constant content of pigment made of oxide(s) of rutile structure, the alumina content is increased to lighten the color.

In a fifth embodiment, the pigment is made of an orthosilicate chosen from the group of zirconium praseodymium orthosilicates (Zr,Pr)SiO$_4$, zirconium vanadium orthosilicates (Zr,V)SiO$_4$, zirconium orthosilicates comprising iron oxide as inclusion. In general, for a constant alumina content, in order to darken the color, the content of pigment made of orthosilicate(s) is preferably greater than 3%, preferably greater than 4%, preferably greater than 5% and/or preferably less than 8%. Also generally, for a constant content of pigment made of orthosilicate(s), the alumina content is increased to lighten the color.

In one embodiment, the pigment is a mixture of several pigments according to the first to fifth embodiments above.

When the black or gray color is sought for the sintered part to be manufactured, the pigment may be chosen in the following manner:
  the pigment is made of an oxide of perovskite structure such that A and B are chosen in the following manner:
    A may be chosen from the group $G_A'(1)$ formed by calcium Ca, strontium Sr, barium Ba, lanthanum La, praseodymium Pr, neodymium Nd, bismuth Bi, cerium Ce, and mixtures thereof.
    Preferably, A is chosen from the group $G_A'(2)$ formed by lanthanum, praseodymium, neodymium, bismuth, cerium, and mixtures thereof.
    Preferably also, A is chosen from the group $G_A'(3)$ formed by lanthanum.
    B may be chosen from the group $G_B'(1)$ formed by mixtures of cobalt and iron CoFe$_{1-x}$, with x between 0.2 and 0.4, mixtures of cobalt and manganese Co$_x$Mn$_{1-x}$, with x between 0.2 and 0.4, mixtures of chromium and manganese Cr$_x$Mn$_{1-x}$, with x between 0.2 and 0.4, mixtures of chromium and iron Cr$_x$Fe$_{1-x}$, with x between 0.3 and 0.5, mixtures of manganese and iron Mn$_x$Fe$_{1-x}$, with x between 0.4 and 0.7, mixtures of nickel and iron Ni$_x$Fe$_{1-x}$, with x between 0.4 and 0.7, and mixtures thereof.
    Preferably, B is chosen from the group $G_B'(2)$ formed by mixtures of cobalt and chromium and iron Co$_x$Cr$_y$Fe$_z$, with x between 0.1 and 0.3, y between 0.1 and 0.3 and z between 0.4 and 0.8 and x+y+z=1, mixtures of cobalt and chromium and iron and manganese Co$_x$Cr$_y$Fe$_z$Mn$_t$, with x between 0.1 and 0.2, y between 0.1 and 0.2, z between 0.3 and 0.5 and t between 0.3 and 0.5 and x+y+z+t=1, mixtures of cobalt and iron and manganese Co$_x$Fe$_y$Mn$_z$, with x between 0.1 and 0.3, y between 0.4 and 0.6 and z between 0.4 and 0.5 and x+y+z=1.
  (R1): When the black color is sought for the sintered part to be manufactured, a particulate mixture according to the invention may comprise an amount of pigment made of oxide(s) of perovskite structure and/or of precursor(s) of such oxides, A and B preferably being chosen from the groups $G_A'(1)$ to (3) and $G_B'(1)$ to (2) above:
    greater than 3% if the amount of alumina in the particulate mixture is less than 10%, and/or
    greater than 4% if the amount of alumina in the particulate mixture is less than 20%, and/or
    greater than 5% if the amount of alumina in the particulate mixture is less than 80%, and/or
    preferably less than 8%.
  (R2): When the gray color is sought for the sintered part to be manufactured, a particulate mixture according to the invention may comprise an amount of pigment made of oxide(s) of perovskite structure and/or of precursor(s) of such oxides, A and B preferably being chosen from the groups $G_A'(1)$ to (3) and $G_B'(1)$ to (2) above:
    less than 3% if the amount of alumina in the particulate mixture is between 2% and 10%, and/or
    less than 4% if the amount of alumina in the particulate mixture is between 10% and 20%, and/or
    less than 5% if the amount of alumina in the particulate mixture is between 20% and 80%.
  the pigment is an oxide of spinel structure such that C and D are chosen in the following manner:
    C may be chosen from the group $G_C'(1)$ formed by nickel Ni in a mole fraction of between 0 and 0.2, copper Cu in a mole fraction of between 0 and 0.2, iron Fe in a mole fraction of between 0.2 and 0.6, zinc Zn in a mole fraction of between 0 and 0.2, manganese Mn in a mole fraction of between 0 and 0.4, cobalt Co in a mole fraction of between 0 and 0.4, and mixtures thereof.
    Preferably, C is chosen from the group $G_C'(2)$ formed by nickel Ni in a mole fraction of between 0 and 0.2, iron Fe in a mole fraction of between 0.2 and 0.6, manganese Mn in a mole fraction of between 0 and 0.4, cobalt Co in a mole fraction of between 0 and 0.4, and mixtures thereof.
    D may be chosen from the group $G_D'(1)$ formed by manganese Mn in a mole fraction of between 0 and 0.4, iron Fe in a mole fraction of between 0.2 and 0.6, chromium Cr in a mole fraction of between 0.2 and 0.6, aluminum Al in a mole fraction of between 0 and 0.4, titanium Ti in a mole fraction of between 0 and 0.4, and mixtures thereof.
    Preferably, D is chosen from the group $G_D'(2)$ formed by manganese Mn in a mole fraction of between 0 and 0.4, iron Fe in a mole fraction of between 0.2 and 0.6, chromium Cr in a mole fraction of between 0.2 and 0.6, and mixtures thereof.
  (R3): When the black color is sought for the sintered part to be manufactured, a particulate mixture according to the invention may comprise an amount of pigment made of oxide(s) of spinel structure, C and D preferably being chosen from the groups $G_C'(1)$ to (2) and $G_D'(1)$ to (2) above, greater than 3%.
  (R4): When the gray color is sought for the sintered part to be manufactured, a particulate mixture according to the invention may comprise an amount of pigment made of oxide(s) of spinel structure, C and D preferably being chosen from the groups $G_C'(1)$ to (2) and $G_D'(1)$ to (2) above, less than 3%.

When the blue color is sought for the sintered part to be manufactured, the pigment may be chosen in the following manner:
  (R5): the pigment is an oxide of perovskite structure such that A and B are chosen in the following manner:
    A may be chosen from the group $G_A''(1)$ formed by calcium Ca, strontium Sr, barium Ba, lanthanum La, praseodymium Pr, neodymium Nd, bismuth Bi, cerium Ce, and mixtures thereof.
    Preferably, A is chosen from the group $G_A''(2)$ formed by lanthanum, praseodymium, neodymium, bismuth, cerium, and mixtures thereof.
    Preferably also, A is chosen from the group $G_A''(3)$ formed by lanthanum.

B may be chosen from the group $G_B''(1)$ formed by mixtures of cobalt and iron $Co_xFe_{1-x}$, with x between 0.5 and 0.95, mixtures of cobalt and manganese $Co_xMn_{1-x}$, with x between 0.5 and 0.95, mixtures of cobalt and chromium $Co_xCr_{1-x}$, with x between 0.5 and 0.95, mixtures of cobalt and nickel $Co_xNi_{1-x}$, with x between 0.5 and 0.95, mixtures of cobalt and titanium $Co_xTi_{1-x}$, with x between 0.5 and 0.95, mixtures of cobalt and copper $Co_xCu_{1-x}$, with x between 0.5 and 0.95, cobalt, and mixtures thereof.

Preferably, B is chosen from the group $G_B''(2)$ formed by mixtures of cobalt and iron $Co_xFe_{1-x}$, with x between 0.8 and 0.95, mixtures of cobalt and manganese $Co_xMn_{1-x}$, with x between 0.8 and 0.95, mixtures of cobalt and chromium $Co_xCr_{1-x}$, with x between 0.8 and 0.95, mixtures of cobalt and nickel $Co_xNi_{1-x}$, with x between 0.8 and 0.95, mixtures of cobalt and titanium $Co_xTi_{1-x}$, with x between 0.8 and 0.95, mixtures of cobalt and copper $Co_xCu_{1-x}$, with x between 0.8 and 0.95, cobalt, mixtures of cobalt and chromium and iron $Co_xCr_yFe_z$, with x between 0.5 and 0.8, y between 0.1 and 0.4 and z between 0.1 and 0.4 and x+y+z=1, mixtures of cobalt and chromium and iron and manganese $Co_xCr_yFe_zMn_t$, with x between 0.5 and 0.7, y between 0.1 and 0.3, z between 0.1 and 0.3 and t between 0.1 and 0.3 and x+y+z+t=1, mixtures of cobalt and iron and manganese $Co_xFe_yMn_z$, with x between 0.5 and 1, y between 0.1 and 0.4 and z between 0.1 and 0.4 and x+y+z=1.

(R6): When the dark blue color is sought for the sintered part to be manufactured, a particulate mixture according to the invention may comprise an amount of pigment made of oxide(s) of perovskite structure and/or of precursor(s) of such oxides, A and B preferably being chosen from the groups $G_A''(1)$ to (3) and $G_B''(1)$ to (2) above:
  greater than 3% if the amount of alumina in the particulate mixture is less than 10%, and/or
  greater than 4% if the amount of alumina in the particulate mixture is less than 20%, and/or
  greater than 5% if the amount of alumina in the particulate mixture is less than 80%, and/or
  preferably less than 8%.

(R7): When the light blue color is sought for the sintered part to be manufactured, a particulate mixture according to the invention may comprise an amount of pigment made of oxide(s) of perovskite structure and/or of precursor(s) of such oxides, A and B preferably being chosen from the groups $G_A''(1)$ to (3) and $G_B''(1)$ to (2) above:
  less than 3% if the amount of alumina in the particulate mixture is between 2% and 10%, and/or
  less than 4% if the amount of alumina in the particulate mixture is between 10% and 20%, and/or
  less than 5% if the amount of alumina in the particulate mixture is between 20% and 80%.

(R8): the pigment is an oxide of spinet structure such that C and D are chosen in the following manner:
  C may be chosen from the group $G_C''(1)$ formed by nickel Ni in a mole fraction of between 0 and 0.2, zinc Zn in a mole fraction of between 0 and 0.2, cobalt Co in a mole fraction of between 0.4 and 1, tin Sn in a mole fraction of between 0 and 0.2 and in a mole fraction equal to 1, cobalt and zinc, and mixtures thereof.

Preferably, C is chosen from the group $G_C''(2)$ formed by cobalt Co in a mole fraction equal to 1, tin Sn in a mole fraction equal to 1, mixtures of cobalt and zinc, and mixtures thereof.

D may be chosen from the group $G_D''(1)$ formed by chromium Cr in a mole fraction of between 0 and 0.4, aluminum Al in a mole fraction of between 0 and 0.1, titanium Ti in a mole fraction of between 0 and 1, cobalt in a mole fraction equal to 1 unless the element C is cobalt, mixtures of aluminum and chromium, and mixtures thereof.

Preferably, D is chosen from the group $G_D''(2)$ formed by aluminum Al in a mole fraction equal to 1, cobalt in a mole fraction equal to 1 unless the element C is cobalt, mixtures of aluminum and chromium, and mixtures thereof.

Preferably, the oxide of spinel structure is chosen from the group formed by $Co_2SnO_4$, $CoAl_2O_4$, $Co(Cr,Al)_2O_4$, $(Co,Zn)Al_2O_4$ and mixtures thereof.

(R9): the pigment is a zirconium vanadium orthosilicate $(Zr,V)SiO_4$.

When the green color is sought for the sintered part to be manufactured, the pigment may be chosen in the following manner:

(R10): the pigment is an oxide of perovskite structure such that A and B are chosen in the following manner:
  A may be chosen from the group $G_A'''(1)$ formed by calcium Ca, strontium Sr, barium Ba, lanthanum La, praseodymium Pr, neodymium Nd, bismuth Bi, cerium Ce, and mixtures thereof.

Preferably, A is chosen from the group $G_A'''(2)$ formed by lanthanum, praseodymium, neodymium, bismuth, cerium, and mixtures thereof.

Preferably also, A is chosen from the group $G_A'''(3)$ formed by lanthanum.

B may be chosen from the group $G_B'''(1)$ formed by mixtures of chromium and iron $Cr_xFe_{1-x}$, with x between 0.5 and 0.95, mixtures of chromium and manganese $Cr_xMn_{1-x}$, with x between 0.5 and 0.95, mixtures of chromium and cobalt $Cr_xCo_{1-x}$, with x between 0.5 and 0.95, mixtures of chromium and nickel $Cr_xNi_{1-x}$, with x between 0.5 and 0.95, mixtures of chromium and titanium $Cr_xTi_{1-x}$, with x between 0.5 and 0.95, mixtures of chromium and copper $Cr_xCu_{1-x}$, with x between 0.5 and 0.95, mixtures of nickel and iron $Ni_xFe_{1-x}$, with x between 0.5 and 0.95, mixtures of nickel and manganese $Ni_xMn_{1-x}$, with x between 0.5 and 0.95, mixtures of nickel and cobalt $Ni_xCo_{1-x}$, with x between 0.5 and 0.95, mixtures of nickel and titanium $Ni_xTi_{1-x}$, with x between 0.5 and 0.95, chromium, nickel, and mixtures thereof.

Preferably, B is chosen from the group $G_B'''(2)$ formed by mixtures of chromium and iron $Cr_xFe_{1-x}$, with x between 0.8 and 0.95, mixtures of chromium and manganese $Cr_xMn_{1-x}$, with x between 0.8 and 0.95, mixtures of chromium and cobalt $Cr_xCo_{1-x}$, with x between 0.8 and 0.95, mixtures of chromium and nickel $Cr_xNi_{1-x}$, with x between 0.8 and 0.95, mixtures of chromium and titanium $Cr_xTi_{1-x}$, with x between 0.8 and 0.95, mixtures of chromium and copper $Cr_xCu_{1-x}$, with x between 0.8 and 0.95, mixtures of chromium and cobalt and iron $Cr_xCo_yFe_z$, with x between 0.5 and 0.7, y between 0.2 and 0.4 and z between 0.1 and 0.3 and x+y+z=1, mixtures of chromium and cobalt and iron and manganese $Cr_xCo_yFe_zMn_t$, with x between 0.5 and 0.6, y between 0.2 and 0.3, z between 0.1 and 0.3 and t between 0.1 and 0.3 and x+y+z+t=1, mixtures of chromium and iron and manganese $Cr_xFe_yMn_z$, with x between 0.6 and 0.8, y between 0.1 and 0.3 and z between 0.1 and 0.4 and x+y+z=1, mixtures of nickel and iron $Ni_xFe_{1-x}$, with x between 0.8 and 0.95, mixtures of nickel and manganese $Ni_xMn_{1-x}$, with x between 0.8 and 0.95, mixtures of nickel and cobalt $Ni_xCo_{1-x}$, with x between 0.8 and 0.95, mixtures of nickel and titanium $Ni_xTi_{1-x}$, with x between 0.8 and 0.95, mixtures of nickel and cobalt and chromium $Ni_xCo_yCr_z$, with x between 0.5 and 0.8, y between 0.1 and 0.4, z between 0.1 and 0.4 and x+y+z=1, mixtures of nickel and cobalt and chromium and manganese $Ni_xCo_yCr_zMn_t$, with x between 0.5 and 0.7, y between 0.1 and 0.3, z between 0.1 and 0.3 and t between 0.1 and 0.3 and x+y+z+t=1, mixtures of nickel and chromium and manganese $Ni_xCr_yMn_z$, with x between 0.5 and 0.8, y between 0.1 and 0.4, z between 0.1 and 0.4 and x+y+z=1, chromium, nickel.

(R11): When the dark green color is sought for the sintered part to be manufactured, a particulate mixture according to the invention may comprise an amount of powder made of oxide(s) of perovskite structure and/or of precursor(s) of such oxides, A and B preferably being chosen from the groups $G_A'''(1)$ to (3) and $G_B'''(1)$ to (2) above:
  greater than 3% if the amount of alumina in the particulate mixture is less than 10%, and/or
  greater than 4% if the amount of alumina in the particulate mixture is less than 20%, and/or
  greater than 5% if the amount of alumina in the particulate mixture is less than 80%, and/or
  preferably less than 8%.

(R12): When the light green color is sought for the sintered part to be manufactured, a particulate mixture according to the invention may comprise an amount of powder made of oxide(s) of perovskite structure and/or of precursor(s) of such oxides, A and B preferably being chosen from the groups $G_A'''(1)$ to (3) and $G_B'''(1)$ to (2) above:
  less than 3% if the amount of alumina in the particulate mixture is between 2% and 10%, and/or
  less than 4% if the amount of alumina in the particulate mixture is between 10% and 20%, and/or
  less than 5% if the amount of alumina in the particulate mixture is between 20% and 80%.

(R13): the pigment is an oxide of spinel structure chosen from the group formed by $CoCr_2O_4$, $TiCo_2O_4$, and mixtures thereof.

(R14): When the turquoise color is sought for the sintered part to be manufactured, the pigment may be a pigment of perovskite structure such that A and B are chosen in the following manner:
  A may be chosen from the group $G_A^{4'}(1)$ formed by calcium Ca, strontium Sr, barium Ba, lanthanum La, praseodymium Pr, neodymium Nd, bismuth Bi, cerium Ce, and mixtures thereof.
  Preferably, A is chosen from the group $G_A^{4'}(2)$ formed by lanthanum, praseodymium, neodymium, bismuth, cerium, and mixtures thereof.
  Preferably also, A is chosen from the group $G_A^{4'}(3)$ formed by lanthanum La.
  B may be chosen from the group $G_B^{4'}(1)$ formed by mixtures of chromium and cobalt $Cr_xCo_{1-x}$, with x between 0.3 and 0.8, mixtures of nickel and cobalt $Ni_xCo_{1-x}$, with x between 0.3 and 0.8, mixtures of chromium and copper $Cr_xCu_{1-x}$, with x between 0.3 and 0.8, mixtures of nickel and copper $Ni_xCu_{1-x}$, with x between 0.3 and 0.8, mixtures of nickel and titanium $Ni_xTi_{1-x}$, with x between 0.3 and 0.8, copper, and mixtures thereof.
  Preferably, B is chosen from the group $G_B^{4'}(2)$ formed by mixtures of chromium and cobalt $Cr_xCo_{1-x}$, with x between 0.4 and 0.6, mixtures of nickel and cobalt $Ni_xCo_{1-x}$, with x between 0.4 and 0.6, mixtures of nickel and cobalt and chromium $Ni_xCo_yCr_z$, with x between 0.2 and 0.3, y between 0.4 and 0.6 and z between 0.2 and 0.3 and x+y+z=1, and copper.

When the turquoise color is desired for the sintered part to be manufactured, a particulate mixture according to the invention may in particular comprise an amount of powder made of oxide(s) of perovskite structure and/or of precursor(s) of such oxides greater than 3%, preferably greater than 4%, and/or less than 6%, A and B preferably being chosen from the groups $G_A^{4'}(1)$ to (3) and $G_B^{4'}(1)$ to (2) above.

When the orange color is desired for the sintered part to be manufactured, the pigment may be chosen in the following manner:

(R15): the pigment is an oxide of perovskite structure such that A and B are chosen in the following manner:
  A may be chosen from the group $G_A^{5'}(1)$ formed by calcium Ca, strontium Sr, barium Ba, lanthanum La, praseodymium Pr, neodymium Nd, bismuth Bi, cerium Ce, and mixtures thereof.
  Preferably, A is chosen from the group $G_A^{5'}(2)$ formed by lanthanum, praseodymium, bismuth, cerium, and mixtures thereof.
  B may be chosen from the group $G_B^{5'}(1)$ formed by iron.

(R16): the pigment is an oxide of rutile structure such that F is chosen from the group $G_F'(1)$ formed by mixtures of titanium and chromium and niobium, mixtures of titanium and chromium and tungsten, and mixtures thereof.

When the brown color is sought for the sintered part to be manufactured, the pigment may be chosen in the following manner:

(R17): the pigment is an oxide of perovskite structure such that A and B are chosen in the following manner;
  A may be chosen from the group $G_A^{6'}(1)$ formed by calcium Ca, strontium Sr, barium Ba, lanthanum La, praseodymium Pr, neodymium Nd, bismuth Bi, cerium Ce, and mixtures thereof.
  Preferably, A is chosen from the group $G_A^{6'}(2)$ formed by lanthanum, praseodymium, neodymium, bismuth, cerium, and mixtures thereof.
  Preferably, A is chosen from the group $G_A^{6'}(3)$ formed by lanthanum.
  B may be chosen from the group $G_B^{6'}(1)$ formed by mixtures of chromium and iron $Cr_xFe_{1-x}$, with x between 0.05 and 0.5, mixtures of nickel and iron $Ni_xFe_{1-x}$, with x between 0.05 and 0.5, mixtures of manganese and iron $Mn_xFe_{1-x}$, with x between 0.05 and 0.5, and mixtures thereof.

(R18): When the dark brown color is sought for the sintered part to be manufactured, a particulate mixture according to the invention may comprise an amount of powder made of oxide(s) of perovskite structure and/or of precursor(s) of such oxides, A and B preferably being chosen from the groups $G_A^{6'}(1)$ to (3) and $G_B^{6'}(1)$ above:
  greater than 3% if the amount of alumina in the particulate mixture is less than 10%, and/or
  greater than 4% if the amount of alumina in the particulate mixture is less than 20%, and/or greater than 5% if the amount of alumina in the particulate mixture is less than 80%, and/or
preferably less than 8%.

(R19): When the light brown color is sought for the sintered part to be manufactured, a particulate mixture according to the invention may comprise an amount of powder made of oxide(s) of perovskite structure and/or of precursor(s) of such oxides, A and B preferably being chosen from the groups $G_A^{6'}(1)$ to (3) and $G_B^{6'}(1)$ above:
less than 3% if the amount of alumina in the particulate mixture is between 2% and 10%, and/or
less than 4% if the amount of alumina in the particulate mixture is between 10% and 20%, and/or
less than 5% if the amount of alumina in the particulate mixture is between 20% and 80%.

(R20): the pigment is an oxide of spinel structure chosen from the group formed by $Fe(Fe,Cr)_2O_4$, $Fe_2TiO_4$, $NiFe_2O_4$, $(Zn,Fe)Fe_2O_4$, $(Fe,Mn)(Fe,Mn,Cr)_2O_4$, $(Zn,Mn)(Mn,Cr)_2O_4$ and mixtures thereof.

(R21): the pigment is an oxide of rutile structure such that F is chosen from the group $G_F''(1)$ formed by mixtures of titanium and niobium and manganese.

When the red color is sought for the sintered part to be manufactured, the pigment may be chosen in the following manner:
(R22): the pigment is an oxide of spinel structure such that C and D are chosen in the following manner:
The element C at the site C of the spinel structure is zinc Zn.
The element D at the site D of the spinel structure is mixtures of aluminum and chromium.
(R23): the pigment is an oxide of hematite structure such that the element E at the site E of the hematite structure is chosen from the group $G_E(1)$ formed by mixtures of aluminum and chromium, of aluminum and manganese.
(R24): the pigment is an oxide of rutile structure such that F is chosen from the group $G_F'''(1)$ formed by mixtures of tin and chromium.
(R25): the pigment is a zirconium orthosilicate comprising iron oxide as inclusion.

When the violet color is sought for the sintered part to be manufactured, the pigment may be chosen in the following manner:
(R26): the pigment is an oxide of perovskite structure such that A and B are chosen in the following manner:
A may be chosen from the group $G_A^{7'}(1)$ formed by calcium Ca, strontium Sr, barium Ba, lanthanum La, praseodymium Pr, neodymium Nd, bismuth Bi, cerium Ce, and mixtures thereof.
Preferably, A is chosen from the group $G_A^{7'}(2)$ formed by lanthanum, neodymium, and mixtures thereof.
B may be chosen from the group $G_B^{7'}(1)$ formed by mixtures of cobalt and manganese $Co_xMn_{1-x}$, with x between 0.05 and 0.2.

When the yellow color is sought for the sintered part to be manufactured, the pigment may be chosen in the following manner:
(R27): the pigment is an oxide of rutile structure such that F is chosen from the group $G_F^{4'}(1)$ formed by mixtures of tin and vanadium.
(R28): the pigment is a zirconium praseodymium orthosilicate $(Zr,Pr)SiO_4$.

The invention also relates to an assembly comprising a particulate mixture according to the invention and a notice, for example in the form of a label placed on packaging of the particulate mixture or a booklet attached to the particulate mixture, the notice indicating that the particulate mixture is intended for the manufacture of decorative sintered parts.

The notice may indicate, for example, "powder for decorative ceramic" or "powder for colored ceramic".

Preferably, the notice provides one or more of the following instructions:
how to convert the particulate mixture into a ceramic part (for example metering, sintering conditions; technical precautions, especially for ensuring uniformity of the color);
how to polish the ceramic part;
how to check the color of the ceramic part.

The packaging may be, for example, a bag, for example of "big bag" type, a drum, a keg or a carton.

The invention also relates to a process for manufacturing a sintered part, comprising the following steps:
a) mixing of the starting materials to form a starting feedstock,
b) forming a preform from said starting feedstock,
c) sintering said preform so as to obtain said sintered part,
d) optionally, polishing said sintered part, preferably until the surface roughness Ra is less than 0.05 µm, preferably less than 0.02 µm and more preferably less than 0.01 µm,
e) optionally, checking the color of the sintered part, especially by measuring the parameters L* and/or a*, and/or b*,
which is noteworthy in that the starting feedstock comprises a particulate mixture in accordance with the invention.

In a preferred embodiment, the starting feedstock of step a) (and especially the nature and composition of the pigment) is determined as a function of a desired color for said sintered part.

Preferably, a powder made of oxide(s) of perovskite structure and/or of oxides of spinet structure, and/or a powder made of oxide of hematite structure $E_2O_3$, the element E being chosen from the group $G_E(1)$ formed by mixtures of aluminum and chromium, mixtures of aluminum and manganese, and mixtures thereof, and/or a powder of an oxide of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and mixtures thereof, and/or a powder of an orthosilicate chosen from the group of zirconium praseodymium orthosilicates $(Zr,Pr)SiO_4$, zirconium vanadium orthosilicates $(Zr,V)SiO_4$, zirconium orthosilicates comprising iron oxide as inclusion, are added to the starting feedstock,
the amount and nature of said orthosilicate(s) and/or of said oxide(s) of perovskite structure and/or of said oxide(s) of spinet structure and/or of said oxide(s) of hematite structure and/or of said oxide(s) of rutile structure being determined as a function of said color,
the oxide(s) of perovskite structure possibly being replaced, totally or partially, with an equivalent amount of precursor(s) of these oxides.

The amount and nature of said orthosilicate(s) and/or of said oxide(s) of perovskite structure and/or of said oxide(s) of spinel structure and/or of said oxide(s) of hematite structure and/or of said oxide(s) of rutile structure may especially be determined according to the rules (especially (R1) to (R29)), and variants thereof defined above.

The adaptation of the starting feedstock to comply with these rules does not present any particular difficulty.

However, it is also possible to obtain, after step c), a sintered part of a determined color by adding to the starting feedstock pigment powders described above as suitable for obtaining other colors. By way of example, a sintered part of green color may be obtained according to the process by adding to the starting feedstock a zirconium praseodymium orthosilicate $(Zr,Pr)SiO_4$ described above as suitable to obtain a yellow color, and a zirconium vanadium orthosilicate $(Zr,V)SiO_4$ described above as suitable for obtaining a blue color.

The process may especially be performed to manufacture a decorative article according to the invention.

In particular, this process may be used to manufacture a sintered part in which the sum of the contents of alumina and of zirconia is greater than 70%, as a mass percentage on the basis of the oxides, and having a determined color.

Preferably, the process is performed for the manufacture of a plurality of sintered parts, a step e) of checking the color is performed on a sample of said sintered parts, and the starting feedstock is adapted as a function of the difference between the color of the sintered parts of the sample and the desired color in order for the color of the sintered parts subsequently manufactured to be closer to the desired color.

Preferably, the starting feedstock is modified such that the index ΔE evaluating the color difference between the manufactured sintered parts and the desired color is less than 5, less than 2, or even less than 1.

In one embodiment, the starting feedstock contains particles in which stabilized or non-stabilized zirconia and an oxide chosen from the group $G_S(1)$ (a mixture of oxides itself being "an oxide") are intimately mixed, and a stabilized or non-stabilized alumina powder and an oxide chosen from the group $G_S(2)$ are intimately mixed.

In step c), the preform is sintered, preferably in air, preferably at atmospheric pressure or under pressure (hot pressing) or hot isostatic pressing (HIP) and at a temperature of between 1200° C. and 1500° C., preferably greater than 1350° C., or even 1400° C. and/or less than 1450° C.

The invention also relates to a sintered part having the following chemical composition, as mass percentages on the basis of the oxides:
  zirconia $ZrO_2 \geq 10\%$;
  2% to 20.0% of an oxide chosen from the group $G_S(1)$ formed by $Y_2O_3$, $Sc_2O_3$, MgO, CaO, $CeO_2$, and mixtures thereof, the content of MgO+CaO being less than 5.0%;
  2%<alumina $Al_2O_3 \leq 80\%$;
  0 to 18.0% of an oxide chosen from the group $G_S(2)$ formed by ZnO, lanthanide oxides with the exception of $CeO_2$, and mixtures thereof;
  less than 12.0% of other oxides;
said sintered part comprising 0.5% to 10.0% of a pigment made of a material chosen from
  oxide(s) of perovskite structure,
  oxides of spinel structure,
  oxides of hematite structure $E_2O_3$, the element E being chosen from the group $G_E(1)$ formed by mixtures of aluminum and chromium, mixtures of aluminum and manganese, and mixtures thereof,
  oxides of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and mixtures thereof,
  orthosilicates chosen from the group of zirconium praseodymium orthosilicates $(Zr,Pr)SiO_4$, zirconium vanadium orthosilicates $(Zr,V)SiO_4$, zirconium orthosilicates comprising iron oxide as inclusion.

In one embodiment, the oxide of the group $G_S(1)$ is a zirconia stabilizer.

In another embodiment, the oxide of the group $G_S(2)$ is an alumina stabilizer.

The invention relates in particular to a sintered part that is obtained or that may be obtained from a particulate mixture according to the invention, in particular manufactured in accordance with a manufacturing process according to the invention.

The inventors have discovered that such a sintered part has an appearance that is particularly suited for use in a decorative article when its surface roughness Ra is less than 0.05 μm, preferably less than 0.02 μm, more preferably less than 0.01 μm, or is between 0.1 and 0.5 μm.

Preferably, this sintered part has a density of greater than 98%, preferably greater than 99%, preferably greater than 99.5% of the theoretical density. The reason for this is that the inventors have discovered that a high density advantageously leads to good development of the color in the sintered part, and to good mechanical properties.

Preferably, the zirconia of this sintered part consists, for more than 80%, preferably for more than 90%, preferably for more than 95%, by volume, of quadratic and/or cubic phase, the remainder to 100% consisting of monoclinic phase.

Preferably, the median size of the zirconia grains is less than 2 μm, preferably less than 1 μm, or even less than 0.5 μm.

Preferably, the median size of the alumina grains is less than 2 μm, preferably less than 1 μm, or even less than 0.5 μm.

Preferably, the median size of the pigment grains is less than 2 μm, preferably less than 1 μm, or even less than 0.5 μm.

The pigment may be chosen from the oxides of perovskite structure such that A and B belong to the groups $G_A$ (1) to (3) and $G_B$ (1) to (2), the oxides of spinel structure such that C and D belong to the groups $G_C$ (1) to (2) and $G_D$ (1) to (2), the oxides of hematite structure such that E belongs to the group $G_E(1)$, the oxides of rutile structure such that F belongs to the group $G_F$ (1), a zirconium praseodymium orthosilicate $(Zr,Pr)SiO_4$, a zirconium vanadium orthosilicate $(Zr,V)SiO_4$, a zirconium orthosilicate comprising iron oxide as inclusion, and mixtures thereof, as described above.

A sintered part according to the invention may in particular be of black, or even gray, color, chosen especially from the oxides of perovskite structure such that A and B belong to the groups $G_A'(1)$ to (3) and $G_B'(1)$ to (2), and/or by choosing the oxides of spinel structure such that C and D belong to the groups $G_C'(1)$ to (2) and $G_D'(1)$ to (2), as described above.

It may in particular have the following color parameters, measured according to NF standard ISO 7724:
  L*<50 for the gray color, and if the black color is sought:
    L*<10, preferably L*<5, preferably L*<1 and/or
  |a*|<5, preferably |a*|<2, preferably |a*|<1, preferably |a*|<0.5 and/or
  |b*|<5, preferably |b*|<2, preferably |b*|<1, preferably |b*|<0.5.

A sintered part according to the invention may also be of blue color, by especially choosing the oxides of perovskite structure such that A and B belong to the groups $G_A''(1)$ to (3) and $G_B''(1)$ to (2), and/or by choosing the oxides of spinel structure such that C and D belong to the groups $G_C''(1)$ to (2) and $G_D''(1)$ to (2), in particular by choosing said oxides of spinel structure from the group formed from $Co_2SnO_4$, $CoAl_2O_4$, $Co(Cr,Al)_2O_4$, $(Co,Zn)Al_2O_4$ and mixtures thereof, and/or by choosing a zirconium vanadium orthosilicate $(Zr,V)SiO_4$, as described above.

It may in particular have the following color parameters, measured according to NF standard ISO 7724:

10<L*<30, preferably 10<L*<20 for the dark blue color, and if the light blue color is sought: 30<L*<70, preferably 30<L*<50, and/or a*<5, preferably a*<0, and/or b*<−10, preferably b*<−20.

A sintered part according to the invention may also be of green color, by especially choosing the oxides of perovskite structure such that A and B belong to the groups $G_A'''(1)$ to (3) and $G_B'''(1)$ to (2), and/or by choosing the oxides of spinel structure from the group formed by $CoCr_2O_4$, $TiCo_2O_4$, and mixtures thereof, as described above.

It may in particular have the following color parameters, measured according to NF standard ISO 7724:

10<L*<30, preferably 10<L*<20 for the dark green color, and if the light green color is sought: 30<L*<70, preferably 30<L*<50, and/or a*<−5, preferably a*<−10, and/or b*>0, preferably b*>20.

A sintered part according to the invention may also be of turquoise color, by especially choosing the oxides of perovskite structure such that A and B belong to the groups $G_A^{4'}(1)$ to (3) and $G_B^{4'}(1)$ to (2), as described above.

It may in particular have the following color parameters, measured according to NF standard ISO 7724:

30<L*<70, preferably 30<L*<50 for the light turquoise color, and/or a*<−5, preferably a*<−10, and/or −10<b*<0, preferably −5<b*<0.

A sintered part according to the invention may also be of orange color, by especially choosing the oxides of perovskite structure such that A and B belong to the groups $G_A^{5'}(1)$ to (2) and $G_B^{5'}(1)$, and/or by choosing the oxides of rutile structure such that F belongs to $G_F'(1)$, as described above.

It may in particular have the following color parameters, measured according to NF standard ISO 7724:

30<L*<70, preferably 30<L*<50 for the light orange color, and/or a*>5, preferably a*>10, and/or b*>10, preferably b*>20.

A sintered part according to the invention may also be of brown color, by especially choosing the oxides of perovskite structure such that A and B belong to the groups $G_A^{6'}(1)$ to (3) and $G_B^{6'}(1)$, and/or by choosing the oxides of spinel structure from the group formed by $Fe(Fe,Cr)_2O_4$, $Fe_2TiO_4$, $NiFe_2O_4$, $(Zn,Fe)Fe_2O_4$, $(Fe,Mn)(Fe,Mn,Cr)_2O_4$, $(Zn,Mn)(Mn,Cr)_2O_4$ and mixtures thereof, and/or by choosing the oxides of rutile structure such that F belongs to the group $G_F''(1)$, as described above.

It may in particular have the following color parameters, measured according to NF standard ISO 7724:

10<L*<30, preferably 10<L*<20 for the dark brown color, and if the light brown color is sought: 30<L*<70, preferably 30<L*<50, and/or a*>5, preferably a*>10, and/or b*>10, preferably b*>20.

A sintered part according to the invention may also be of red color, by especially choosing the oxides of spinel structure such that C is zinc and D is a mixture of aluminum and chromium, and/or by choosing the oxides of hematite structure such that E belongs to the group $G_E(1)$, and/or by choosing the oxides of rutile structure such that F belongs to the group $G_F'''(1)$, and/or by choosing a zirconium orthosilicate comprising iron oxide as inclusion, as described above.

It may in particular have the following color parameters, measured according to NF standard ISO 7724:

30<L*<70, preferably 30<L*<50 for the light red color, and/or a*>5, preferably a*>10, and/or

|b*|<10, preferably |b*|<5.

A sintered part according to the invention may also be of dark violet color, by especially choosing the oxides of perovskite structure such that A and B belong to the group $G_A^{7'}(1)$ to (2) and $G_B^{7'}(1)$, as described above.

It may in particular have the following color parameters, measured according to NF standard ISO 7724:

10<L*<30, preferably 10<L*<20, and/or a*>5, preferably a*>10, and/or b*<−5, preferably b*<−10.

A sintered part according to the invention may also be of yellow color, by especially choosing the oxides of rutile structure such that F belongs to the group $G_F^{4'}(1)$, and/or by choosing a zirconium praseodymium orthosilicate (Zr,Pr)$SiO_4$, as described above.

It may in particular have the following color parameters, measured according to NF standard ISO 7724:

30<L*<70, preferably 30<L*<50 for the light yellow color, and/or

|a*|<5, and/or b*>10, preferably b*>20.

The composition of a sintered part according to the invention may be identical to that of a particulate mixture according to the invention, by not considering the temporary constituents, in particular, by considering only the oxides. In particular, the sintered part may have the following optional characteristics:

preferably, the sintered part comprises 0.5% to 10.0% of oxide(s) of perovskite structure, the perovskite content in the oxide(s) of perovskite structure is greater than 90%, preferably greater than 95%, preferably greater than 99%, preferably substantially 100%, the content of oxide(s) of perovskite structure is greater than 3%, preferably greater than 4% and/or less than 9%, preferably less than 6%, the zirconium stabilizer is chosen from the group formed by $Y_2O_3$, $Sc_2O_3$ and mixtures thereof and the content of said zirconium stabilizer is less than 8%, preferably less than 6.5%, on the basis of the sum of $ZrO_2$, $Y_2O_3$, $Sc_2O_3$, MgO, CaO and $CeO_2$, the zirconium stabilizer is chosen from the group formed by MgO, CaO and mixtures thereof and the content of said zirconium stabilizer is less than 4%, on the basis of the sum of $ZrO_2$, $Y_2O_3$, $Sc_2O_3$, MgO, CaO and $CeO_2$, the zirconium stabilizer is $CeO_2$ and the content of said zirconium stabilizer is greater than 10% and less than 15%, on the basis of the sum of $ZrO_2$, $Y_2O_3$, $Sc_2O_3$, MgO, CaO and $CeO_2$, the zirconium stabilizer is chosen from the group formed by $Y_2O_3$, $CeO_2$ and mixtures thereof, and preferably satisfies the relationship 10%≤3.$Y_2O_3$+$CeO_2$≤20%, on the basis of the sum of $ZrO_2$, $Y_2O_3$, $Sc_2O_3$, MgO, CaO and $CeO_2$, the zirconium stabilizer is $Y_2O_3$, the content of $Y_2O_3$ is greater than 3%, preferably greater than 4% and/or less than 8%, preferably less than 6.5%, on the basis of the sum of $ZrO_2$, $Y_2O_3$, $Sc_2O_3$, MgO, CaO and $CeO_2$, the alumina content is greater than 10%, preferably greater than 15% and less than 60%, preferably less than 55%, preferably less than 50%, preferably less than 40%, more preferably less than 30%. In one particular embodiment, the alumina content is between 2% and 10%. In another particular embodiment, the alumina content is between 10% and 20%. Finally, in another particular embodiment, the alumina content is between 20% and 80%, the alumina stabilizer is chosen from the group formed by ZnO and lanthanide oxides, with the exception of $CeO_2$, and mixtures thereof, and the content of said alumina stabilizer is less than 15%, preferably less than 10%, preferably less than 8%, preferably less than 5%, on the basis of the sum of $Al_2O_3$, ZnO and lanthanide oxides, with the exception of $CeO_2$, the alumina stabilizer is $La_2O_3$, i.e. the particulate mixture comprises only $La_2O_3$ as alumina stabilizer, the alumina stabilizer is $La_2O_3$ and its content is less than 15%, preferably less than 10%, preferably less than 8%, preferably less than 5%, and/or preferably greater than 0.5%, on the basis of the sum of $Al_2O_3$, ZnO and the lanthanide oxides, with the exception of $CeO_2$, the oxides of perovskite structure are preferably chosen from the groups $G_A'(1)$ to (3) and $G_B'(1)$ to (2), $G_A''(1)$ to (3) and $G_B''(1)$ to (2), $G_A'''(1)$ to (3) and $G_B'''(1)$ to (2), $G_A^{4\prime}(1)$ to (3) and $G_B^{4\prime}(1)$ to (2), $G_A^{5\prime}(1)$ to (2) and $G_B^{5\prime}(1)$, $G_A^{6\prime}(1)$ to (3) and $G_B^{6\prime}(1)$, $G_A^{7\prime}(1)$ to (2) and $G_B^{7\prime}(1)$ above.

The invention also relates to an article chosen from the group formed by an item of jewelry, a watch, a bracelet, a necklace, a ring, a brooch, a tiepin, a handbag, a telephone, an item of furniture and a household tool, for instance a knife or a pair of scissors, a handle (in a car, such as a door handle, a gearstick lever; in the interior compartment, such as a door handle and/or a window handle), a button (such as a cufflink, an actuating button (window button, car stereo button, etc.)), a veneer (of a car dashboard, of a musical instrument, for example of a guitar, of a tool, etc.), a visible part of an item of consumer goods (for instance computer or telephone keys, the outer envelope (or casing) of a computer, etc.), a spectacle frame part, or even spectacle frames, a crockery article, a frame (photograph frame surround), a lid of a device for communicating by radio waves with frequencies of between 800 MHz and 3 GHz, said lid being exposed, at least partly, to the external environment of the device and traversed by at least some of said waves during the use of the device, said article comprising a sintered part according to the invention.

For these articles in particular, a surface roughness Ra of less than 0.05 µm, preferably less than 0.02 µm, more preferably less than 0.01 µm, is considered as particularly advantageous.

The mechanical properties make a sintered part according to the invention suitable for a use in which it is made to undergo abrasive constraints and/or impacts and in which it must conserve its appearance despite these constraints and/or impacts. The invention also relates to such an application.

Preferably, a sintered part according to the invention has:
a resilience of greater than or equal to 4 $MPa \cdot m^{1/2}$, preferably greater than 7 $MPa \cdot m^{1/2}$, preferably greater than 8 $MPa \cdot m^{1/2}$, or even greater than 9 $Pa \cdot m^{1/2}$, and
a hardness HV10 greater than 1300, or even greater than 1400, or even greater than 1600.

The invention also relates to an article comprising a sintered part according to the invention, said sintered part being apparent (i.e. exposed to the exterior), unless said article is at least partially dismantled.

In one embodiment, the sintered part does not substantially participate in the main function of the article, i.e. said sintered part participates in a mainly decorative function, or purely decorative function. In other words, the choice of the sintered part results mainly from an esthetic choice.

In one embodiment, the sintered part exerts a technical function. For example, the sintered part may be a support for another part, and/or may be a protective part, especially for protecting against impacts, in particular for protecting an emitter and/or a receiver capable of emitting and/or receiving radio waves with frequencies of between 800 MHz and 3 GHz.

The decorative article may have a support on which the sintered part is bonded, clipped, sewn or force-fitted. The sintered part may also be cosintered with its support.

In one embodiment, the decorative article comprises several sintered parts according to the invention. In one embodiment, the values of L*, and/or a* and/or b* measured on a first of said sintered parts according to the invention differ by less than 10%, preferably less than 5% from the corresponding values measured on a second of said sintered parts according to the invention. Preferably, this proximity of the values of L*, and/or a* and/or b* is respected irrespective of the first and second sintered parts under consideration according to the invention.

Preferably, the index ΔE measuring the color difference between the first and second parts is such that ΔE<5, preferably ΔE<2, or even ΔE<1.

In one embodiment, the decorative article is wrapped, for example in a sachet, a box or a container, for example in wrapping comprising, or even consisting of, paper and/or carton and/or plastic or metal, preferably in sheet form, preferably a flexible sheet. Preferably, the wrapping bears information stating the intended use of the decorative article and/or technical characteristics of the decorative article.

The invention also relates to a process for manufacturing a decorative article, comprising the following steps:
i) preparation of a support;
ii) preparation of a sintered part according to the invention as a function of a desired color and/or of the desired color uniformity, conventionally defined in a specification;
iii) optionally, checking the color of said sintered part, preferably by measuring at least one, preferably all, of the following parameters: L*, a* and b*;
iv) fixing, rigidly or removably, the sintered part onto the support so as to constitute a decorative article;
v) optionally, wrapping the decorative article.

In one embodiment, the preparation of the sintered part according to the invention (step ii)) comprises
the use of a manufacturing process according to the invention (comprising steps a) to c) or a') to c')), the mixed starting materials, and especially the nature and composition of the pigment, being determined as a function of the desired color and/or of the desired color uniformity for the sintered part, preferably by measurements of L*, a* and b*; and/or
an operation for selection of the sintered part, as a function of a desired color and/or of the desired color uniformity, from a plurality of sintered parts according to the invention. To perform this selection, it is preferable to check the color of a plurality of sintered parts according to the invention, preferably by measuring at least one, and preferably all, of the following parameters: L*, a* and b*, and then to select the sintered part whose color is closest to the desired color.

In the field of colors, the "index ΔE" is conventionally known as the mean quadratic difference between the parameters L*, a* and b* measured on an object ($L_{obj}$, $a_{obj}$ and $b_{obj}$) and the corresponding parameters of the desired color (L, a and b), i.e.:

$$\Delta E=\sqrt{(L_{obj}-L)^2+(a_{obj}-a)^2+(b_{obj}-b)^2}$$

Preferably, the sintered parts are selected such that $\Delta E<5$, preferably $\Delta E<2$, or even $\Delta E<1$.

DEFINITIONS

The "alumina-zirconia" product refers to a product containing zirconia and more than 2% alumina. Zirconia products reinforced with alumina (or "alumina-toughened zirconia" or "ATZ") and alumina products reinforced with zirconia (or "zirconia-toughened alumina" or "ZTA") are alumina-zirconia products that are well known to those skilled in the art.

The term "sintering" means consolidation by heat treatment at more than 1100° C. of a particulate agglomerate, optionally with partial or total melting of some of the constituents of this agglomerate (but not all of these constituents).

A perovskite crystallographic structure corresponds to a particular arrangement of elements in sites conventionally known as "sites A" and "sites B". The "elements A" and "elements B" usually refer to the elements arranged on the sites A and B, respectively. Among the compounds having a perovskite crystallographic structure, "oxides of perovskite structure" are in particular distinguished. These oxides especially comprise compounds of formula $ABO_3$. All the sites A and/or B are not always occupied with elements A and/or B, respectively.

For example, a lanthanum-manganese (LM) oxide of perovskite structure is a compound in which A is lanthanum and B is manganese. Its structure is conventionally defined by a formula of the type $LaMnO_3$. Another example may be a lanthanum-cobalt-iron-manganese oxide of perovskite structure in which A is lanthanum and B a mixture of cobalt, iron and manganese defined by a formula of the type $LaCo_xFe_yMn_zO_3$, with $x+y+z=1$, x, y and z being the mole fractions of the elements cobalt, iron and manganese, respectively.

A spinel crystallographic structure corresponds to a particular arrangement of elements C and D in sites conventionally known as "octahedral sites" and "tetrahedral sites".

Compounds with a spinel crystallographic structure especially comprise the compounds of formula $CD_2O_4$ known as "direct spinels", in which the element C occupies a tetrahedral site and the element D occupies an octahedral site, and the compounds of formulae $D(C,D)O_4$, known as "inverse spinels", in which the element D occupies tetrahedral and octahedral sites and the element C occupies an octahedral site.

For example, a cobalt-chromium oxide of direct spinel structure is a compound in which C is cobalt, arranged on sites C, and D is chromium, arranged on sites D. Its structure is conventionally defined by a formula of the type $CoCr_2O_4$. Another example of spinel is the inverse spinel $TiFe_2O_4$, in which C is titanium arranged on sites D, and D is iron arranged on sites C and sites D. Another example may be a cobalt-iron-chromium oxide of spinel structure in which C is a mixture of cobalt and iron and D a mixture of iron and chromium defined by a formula of the type $(Co_xFe_y)(Fe_zCr_t)_2O_4$, with $x+y=1$ and $z+t=1$, x, y+z and t being the mole fractions of the elements cobalt, iron and chromium, respectively; x and y being the mole fractions of the elements present at sites C, and z and t being the mole fractions of the elements present at sites D.

A hematite crystallographic structure corresponds to a particular arrangement of elements in sites conventionally known as "sites E". The term "elements E" usually refers to the elements located at the sites E.

Among the compounds having a hematite crystallographic structure, "oxides of hematite structure" are in particular distinguished. These oxides especially comprise compounds of formula $E_2O_3$.

For example, a manganese-aluminum oxide of hematite structure is a compound in which E is a mixture of manganese and alumina. Its structure is conventionally defined by a formula of the type $(Mn_xAl_y)_2O_3$, with $x+y=1$, x and y being the mole fractions of the elements manganese and aluminum, respectively.

A rutile crystallographic structure corresponds to a particular arrangement of elements in sites conventionally referred to as "sites F". The term "elements F" usually refers to the elements located at the sites F.

Among the compounds having a rutile crystallographic structure, "oxides of rutile structure" are in particular distinguished. These oxides especially comprise compounds of formula $FO_2$.

For example, a manganese-niobium-titanium oxide of rutile structure is a compound in which F is a mixture of manganese, niobium and titanium. Its structure is conventionally defined by a formula of the type $(Mn_xNb_yTi_z)O_2$, with $x+y+z=1$, x, y and z being the mole fractions of the elements manganese, niobium and titanium.

An element A, B, C, D, E or F may comprise several constituents. A mole fraction of one of these constituents refers to the mole fraction of this constituent in said element.

The "lanthanide oxides" are oxides of the elements No. 57 (lanthanum) to No. 71 (lutetium) of the Periodic Table of the Elements.

The notion "pigment" is well known to those skilled in the art. A pigment is a powder which, when incorporated into a preform, leads, during sintering of said preform, to a particular coloration. Conventionally, a pigment is a powder whose median particle size is less than 50 μm.

By extension, the term "pigment" also refers to the grains corresponding, in the sintered part, to the pigment introduced into the starting feedstock.

The "content" of perovskite, spinel, hematite, rutile or orthosilicate, excluding impurities, as a %, is defined according to formula (1) below:

$$T=100*(A_{PIG})/(A_{PIG}+A_{Secondary\ phase}) \quad (1)$$

in which $A_{PIG}$ is the area measured on an x-ray diffraction diagram obtained using a D5000 diffractometer machine from the company Bruker equipped with a copper DX tube, without deconvolution treatment, of the main diffraction peak or of the main multiplet diffraction peak of the structure under consideration (perovskite, spinel, hematite, rutile or orthosilicate, respectively);

$A_{Secondary\ phase}$ is the area measured on the same diagram, without deconvolution treatment, of the main diffraction peak or main multiplet diffraction peak of the secondary phase. The secondary phase is the phase having the main peak or multiplet of largest area, without taking into account said structure under consideration.

A multiplet is the partial superposition of several peaks. For example, a multiplet composed of two peaks is a doublet, a multiplet composed of three peaks is a triplet.

In a chemical composition, the oxide contents relate to the overall contents for each of the corresponding chemical elements, expressed in the form of the most stable oxide, according to the usual convention in the industry; suboxides and optionally nitrides, oxynitrides, carbides, oxycarbides, carbonitrides, or even metallic species of the abovementioned elements, are therefore included.

The term "impurities" means the inevitable constituents, necessarily introduced with the starting materials or resulting from reactions with these constituents. The impurities are not necessary constituents, but only tolerated. In particular, the compounds forming part of the group of oxides, nitrides, oxynitrides, carbides, oxycarbides, carbonitrides and metallic species of sodium and other alkali metals are impurities. An example that may be mentioned is $Na_2O$. On the other hand, hafnium oxide is not considered as an impurity. It is considered that a total content of impurities of less than 2% does not substantially modify the results obtained.

In a source of zirconia particles, $HfO_2$ is not chemically dissociable from $ZrO_2$. "$ZrO_2$" thus conventionally denotes the total content of these two oxides. According to the present invention, $HfO_2$ is not added deliberately to the starting feedstock. $HfO_2$ therefore denotes only the traces of hafnium oxide, this oxide always being naturally present in the sources of zirconia at contents generally less than 2%. For the sake of clarity, the content of zirconia and of traces of hafnium oxide may therefore be denoted, without preference, by "$ZrO_2$", or alternatively by the "zirconia content".

The term "stabilized zirconia" means a zirconia stabilized with a stabilizer and consisting for more than 80%, or even more than 90%, or even more than 95%, or even substantially 100%, by volume, of quadratic and/or cubic phase, the remainder to 100% consisting of monoclinic phase. The amount of stabilized zirconia is measured by X-ray diffraction. On a bulk part, the measurement surface is polished, the final polishing step being performed with a Mecaprex LD32-E 1 µm diamond-tipped preparation sold by the company PRESI, after the part has undergone a heat treatment at 1000° C. for 1 hour and has been cooled to room temperature. On a powder, the measurement is performed directly on the powder, without preliminary milling.

The term "precursor" refers to a product, a compound or a set of compounds which, during sintering, in air, lead to the formation of said product. In the particular case of an oxide of perovskite structure, a precursor of said oxide of perovskite structure is a compound consisting of an intimate mixture of oxides and/or of precursors of the oxides composing said oxide of perovskite structure. Such an intimate mixture may be obtained, for example, by coprecipitation or atomization. Preferably, the intimate mixture is consolidated by a heat treatment. For example, if a lanthanum-cobalt-iron-manganese oxide of perovskite structure of formula $LaCo_xFe_yMn_zO_3$ is considered, with x+y+z=1, x, y and z being the mole fractions of the elements cobalt, iron and manganese, respectively, a precursor of this oxide of perovskite structure is an intimate mixture of lanthanum oxide, cobalt oxide, iron oxide and manganese oxide. Another possible precursor is an intimate mixture of precursors of these oxides, for instance an intimate mixture of lanthanum nitrate, cobalt nitrate, iron nitrate and manganese nitrate. The mixture must be intimate. For example, a powder which comprises $TiO_2$ particles and MgO particles would not be a precursor of $MgTiO_3$. To this end, it is necessary for $TiO_2$ and MgO to be intimately mixed in the same particle. An intimate mixture of the precipitated salts may also serve as precursor.

An amount of a precursor of a product is said to be "equivalent" to an amount of said product when, during sintering, it leads to said amount of said product.

The term "temporary" means "which may be eliminated from the preform during sintering".

The term "median size" of the grains of a sintered part means the dimension measured according to the "Mean Linear Intercept" method described in the method ASTM E1382.

The term "median size" of a set of particles, generally noted $D_{50}$, means the size dividing the particles of this set into first and second equal populations by mass, these first and second populations comprising only particles having a size greater than or less than, respectively, the median size.

The percentiles or "centiles" 10 ($D_{10}$) and 90 ($D_{90}$) are the particle sizes corresponding to the percentages, by mass, of 10% and 90%, respectively, on the cumulative particle size distribution curve of the particle sizes of the powder, the particle sizes being classified in increasing order. For example, 10%, by mass, of the particles of the powder have a size less than $D_{10}$ and 90% of the particles by mass have a size greater than $D_{10}$. The percentiles may be determined by means of a particle size distribution performed using a laser granulometer.

The specific surface area is calculated by the BET (Brunauer-Emmet-Teller) method as described in the *Journal of The American Chemical Society*, 60 (1938), pages 309 to 316.

Unless otherwise mentioned, all the percentages are mass percentages on the basis of the oxides.

Unless otherwise mentioned, the term "including one" or "comprising one" means "comprising at least one". A particulate mixture according to the invention may thus comprise, for example, a first pigment made of an oxide of perovskite structure and a second pigment made of an oxide of spinel structure.

In the groups $G_A'(1)$ to (3) and $G_B'(1)$ to (2), $G_A''(1)$ to (3) and $G_B''(1)$ to (2), $G_A'''(1)$ to (3) and $G_B'''(1)$ to (2), $G_A^{4'}(1)$ to (3) and $G_B^{4'}(1)$ to (2), $G_A^{5'}(1)$ to (2) and $G_B^{5'}(1)$, $G_A^{6'}(1)$ to (3) and $G_B^{6'}(1)$, $G_A^{7'}(1)$ to (2) and $G_B^{7'}(1)$, the indices x, y, z and t are mole fractions.

DETAILED DESCRIPTION

A particulate mixture according to the invention generally consists, for more than 95%, more than 98%, or even substantially 100%, of oxides.

Preferably, the particulate mixture has a specific surface area, calculated by the BET method, of greater than 3 $m^2/g$, preferably greater than 5 $m^2/g$ and/or less than 30 $m^2/g$, preferably less than 25 $m^2/g$, preferably less than 20 $m^2/g$.

More preferably, it has a median size ($D_{50}$) of less than 10 µm, or even less than 5 µm, or even less than 3 µm, or even less than 1 µm and/or preferably greater than 0.05 µm.

The particulate mixture may be in a dry form, i.e. it may be obtained directly by mixing suitable starting materials. It may also have undergone an additional step, for example an atomization step, in particular so as to improve its chemical homogeneity.

Preferably, the main constituents (i.e. those whose contents are the highest) of the particulate mixture are zirconia and alumina.

The median size of the zirconia is preferably less than 10 µm, or even less than 5 µm, or even less than 3 µm, or even less than 1 µm and/or preferably greater than 0.05 µm.

The median size of the alumina is preferably less than 10 µm, or even less than 5 µm, or even less than 3 µm, or even less than 1 µm and/or preferably greater than 0.05 µm.

In the sintered part, the zirconia must be stabilized. In the particulate mixture, the zirconia may thus, preferably, be stabilized with said zircon stabilizer, preferably with $Y_2O_3$.

The zirconia stabilizer and/or a precursor of such a stabilizer may also, partially or totally, be incorporated into the particulate mixture in powder form, i.e. in a form separate from the zirconia, such that, during sintering, at least part of the zirconia is stabilized.

Preferably, the particulate mixture comprises a zirconia stabilizer chosen from the group formed by $Y_2O_3$, $CeO_2$ and mixtures thereof. Preferably, the amount of $Y_2O_3$, $CeO_2$ satisfies the relationship $10\% \leq 3.Y_2O_3 + CeO_2 \leq 20\%$, on the basis of the sum of $ZrO_2$, $Y_2O_3$, $Sc_2O_3$, $MgO$, $CaO$ and $CeO_2$.

Preferably, said zirconia stabilizer is $Y_2O_3$. The $Y_2O_3$ content may especially be greater than 3%, preferably greater than 4% and/or less than 8%, preferably less than 6.5%, on the basis of the sum of $ZrO_2$, $Y_2O_3$, $Sc_2O_3$, $MgO$, $CaO$ and $CeO_2$.

The median size of the zirconia stabilizer powder and/or of a precursor of such a zirconia stabilizer is preferably less than 1 µm, preferably less than 0.5 µm, more preferably less than 0.1 µm. The efficacy of the zirconia stabilizer is advantageously thereby improved during sintering.

In the sintered part, the alumina may be stabilized. In the particulate mixture, the alumina may thus be stabilized, with said alumina stabilizer, preferably with $La_2O_3$.

The alumina stabilizer and/or a precursor of such a stabilizer may also, partially or totally, be incorporated into the particulate mixture in the form of a powder, i.e. in a form separate from the alumina, such that, during sintering, at least part of the alumina is stabilized.

Preferably, the particulate mixture comprises $La_2O_3$ as alumina stabilizer in an amount of less than 15%, preferably less than 10%, preferably less than 8%, preferably less than 5%, and/or preferably greater than 0.5%, on the basis of the sum of $Al_2O_3$, $ZnO$ and lanthanide oxides, with the exception of $CeO_2$.

The median size of the alumina stabilizer powder and/or of a precursor of such an alumina stabilizer is preferably less than 1 µm, preferably less than 0.5 µm, more preferably less than 0.1 µm. The efficacy of the alumina stabilizer is advantageously thereby improved during sintering.

According to the invention, the particulate mixture also comprises one or more pigments made of oxide(s) of perovskite structure and/or made of precursor(s) of such oxides and/or one or more pigments made of oxide(s) of spinel structure and/or one or more pigments made of oxide(s) of hematite structure $E_2O_3$, the element E being chosen from the group $G_E(1)$ formed by mixtures of aluminum and chromium, mixtures of aluminum and manganese, and mixtures thereof and/or one or more pigments made of oxide(s) of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and mixtures thereof and/or one or more pigments made of an orthosilicate chosen from the group of zirconium praseodymium orthosilicates (Zr,Pr)$SiO_4$, zirconium vanadium orthosilicates (Zr,V)$SiO_4$, and zirconium orthosilicates comprising iron oxide as inclusion.

The particles of said pigments of a particulate mixture according to the invention may be obtained via various processes, such as fusion, solid-phase synthesis, pyrolysis of salts, precipitation of hydroxides and calcination thereof, or sol-gel synthesis.

The inventors have discovered that if the particulate mixture comprises more than 10.0% by mass of said pigments, the mechanical properties, especially the resilience, of the sintered parts are degraded. This degradation is in particular prohibitive when the sintered parts are intended for the manufacture of decorative articles such as watches, bracelets, brooches, tiepins, necklaces, telephones, items of furniture or household tools such as knives or scissors. It is therefore important for these applications that the total content of said pigments should not exceed 10.0%.

A minimum content of 0.5% of said pigments in the particulate mixture is considered as essential for obtaining a sintered part that has good scratch resistance and impact strength, and also an attractive appearance with well-developed and uniform colors.

The pigment used preferably has a median size of less than 5 µm, preferably less than 1 µm, preferably less than 0.5 µm. Advantageously, the efficacy of said pigments in the sintered part is thereby improved.

The "other oxides" are preferably only pigments and impurities.

The impurities preferably represent less than 1.5%, preferably less than 1%, more preferably less than 0.5%, preferably less than 0.2%, preferably less than 0.1%.

A particulate mixture according to the invention may also comprise one or more deflocculants and/or binders and/or lubricants, which are preferably temporary, conventionally used in forming processes for the manufacture of preforms to be sintered, for example an acrylic resin, polyethylene glycol (PEG), or polyvinyl alcohol (PVA).

A sintered part according to the invention may be manufactured from a particulate mixture according to the invention according to a process conventionally comprising steps a) to c). Optionally, this process comprises, prior to step a), a milling step for achieving the particle size characteristics necessary for good subsequent densification of the material. In particular, milling may be performed so that each of the powders used in step a) or so that the particulate mixture of all of these powders has a median size ($D_{50}$) of less than 1 µm.

In step a), a "ready-to-use" particulate mixture according to the invention may be used. As a variant, all the starting materials may be metered out at the time of preparation of the starting feedstock.

The starting feedstock may also comprise one or more deflocculants and/or binders and/or lubricants, which are preferably temporary, conventionally used in forming processes for the manufacture of preforms to be sintered, for example an acrylic resin, polyethylene glycol (PEG), or polyvinyl alcohol (PVA).

The mixture of the starting materials may optionally be atomized before proceeding to step b). Advantageously, the atomization makes it possible to improve the chemical homogeneity of said mixture.

In step b), the mixture is then formed, for example by cold isostatic pressing, in order to form blocks of desired shape.

Other techniques such as slip casting, uniaxial pressing, casting of a gel, vibro-casting, injection molding or a combination of these techniques may be used.

In step c), the preform is sintered, preferably in air, at atmospheric pressure or under pressure (hot pressing) or hot isostatic pressing (HIP) and at a temperature of between 1200° C. and 1500° C., preferably between 1350° C., or even 1400° C., and 1450° C. Advantageously, sintering in this temperature range promotes good development of the color. The maintenance time at this temperature is preferably between 2 and 8 hours. The increase rate is conventionally between 10 and 100° C./hour. The decrease rate may be free. If deflocculants and/or binders and/or lubricants are used, the sintering cycle preferably comprises a steady stage of 1 to 4 hours at a temperature of between 400° C. and 800° C. in order to promote the removal of said products.

The parameters of the manufacturing process, in particular the particle size of the particles of the starting feedstock, the sintering additive, the compression for manufacturing the preform and the sintering temperature may be adapted, in a known manner, so as to adapt the density of the sintered part to the intended application.

The sintered part obtained at the end of step c) may be machined and/or may undergo a surface treatment, for instance polishing or sanding, according to any technique known to those skilled in the art.

EXAMPLES

The chemical analyses were performed by X-ray fluorescence as regards the constituents whose content is greater than 0.5%. The content of the constituents present in an amount less than 0.5% was determined by AES-ICP (Atomic Emission Spectroscopy-Inductively Coupled Plasma).

The specific surface area was measured by adsorption of nitrogen at 77 K and calculated via the BET method at 1 point. The samples are pretreated at 300° C. under a stream of nitrogen for 2 hours before analysis.

The crystal phases in a powder or in a sintered part were determined by X-ray diffraction X on a Brüker D5000 machine (with adjustment for 2θ of 5° to 80°, with an increment of 0.02° and 1 second per increment).

Prior to the measurement, the alumina-zirconia sintered part was polished, the final polishing step having been performed with a Mecaprex LD32-E 1 μm diamond-tipped preparation sold by the company PRESI, and then heat treated at 1000° C. for 1 hour and cooled to room temperature.

The particle size distributions were determined by sedigraphy, by means of a Sedigraph 5100 machine from the company Micromeritics®, after having dispersed by ultrasonication a suspension of the powders to be characterized in the presence of sodium metaphosphate.

An EDS (Energy Dispersive Spectroscopy) analysis, an X-ray diffraction analysis, and/or elemental cartography by microprobe may also be performed to identify the nature of the pigments present in a particulate mixture, and also in the sintered part. Alternatively, it is possible to subject the particulate mixture according to the invention, preferably after forming said particulate mixture, to a heat treatment so as to demonstrate a coloration after said heat treatment, confirming the presence of a pigment.

The median size of the grains of a sintered part was measured via a "Mean Linear Intercept" method, according to standard ASTM E1382. According to this standard, analysis lines are plotted on images of said sintered part, and then, along each analysis line, the lengths, or "intercepts", between two consecutive joints of grains cutting said analysis line are measured. The mean length "l'" of the intercepts "I" is then determined. For the tests below, the intercepts were measured on images obtained by scanning electron microscopy, of sections of the sintered part, said sections having been polished beforehand until a mirror quality was obtained, and then heat-attacked at a temperature 100° C. below the sintering temperature, to reveal the grain joints. The magnification used for taking the images was chosen so as to visualize about 500 grains on an image. 5 images per sintered part were acquired.

The mean size "d" of the grains of the sintered part is given by the relationship: $d = 1.56 \cdot l'$. This formula is derived from "Average Grain Size in Polycrystalline Ceramics" M. I. Mendelson, J. Am. Cerm. Soc. Vol. 52, No. 8, pp. 443-446.

The color measurements were taken according to NF standard ISO 7724 on polished parts in which the final polishing step was performed with a Mecaprex LD32-E 1 μm diamond-tipped preparation sold by the company PRESI, using a CM-2500d machine, manufactured by the company Konica Minolta, with a D65 illuminant (natural light), 10° observer, and specular reflection excluded.

The hardness and the resilience of the tested sintered parts were measured by Vickers indentation on polished sintered parts, the final polishing step having been performed with a 1 μm diamond-bearing paste.

The flexural strength was measured at room temperature by 3-point flexion on machined bars 45 mm×4 mm×3 mm in size.

The following nonlimiting examples are given for the purpose of illustrating the invention.

The powders of the various oxides of perovskite structure used in examples 1 to 12 and 21 are prepared by solid-phase reaction of various nitrates coprecipitated in basic medium with aqueous ammonia. The salts used, sold by Sigma Aldrich, are hydrated lanthanum nitrate $La(NO_3)_3 \cdot xH_2O$, hydrated manganese nitrate $Mn(NO_3)_2 \cdot xH_2O$, cobalt nitrate hexahydrate, $Co(NO_3)_2 \cdot 6H_2O$, iron nitrate nonahydrate $Fe(NO_3)_3 \cdot 9H_2O$, chromium nitrate nonahydrate $Cr(NO_3)_3 \cdot 9H_2O$. The hydrates are dissolved in distilled water at a total concentration of 1 mol/l. The masses of the various nitrates introduced are given in table 1 below:

TABLE 1

| | $La(Co_{0.3}Fe_{0.4}Cr_{0.3})O_3$ | $LaCoO_3$ | $LaFeO_3$ | $La(Co_{0.2}Fe_{0.2}Mn_{0.6})O_3$ | $La(Cr_{0.9}Co_{0.1})O_3$ |
|---|---|---|---|---|---|
| Distilled water | Remainder to 500 ml | Remainder to 500 ml | Remainder to 500 ml | Remainder to 500 ml | Remainder to 500 ml |
| $La(NO_3)_3 \cdot xH_2O$ | 80 g | 80 g | 80 g | 80 g | 80 g |
| $Mn(NO_3)_2 \cdot xH_2O$ | — | — | — | 50 g | — |
| $Cr(NO_3)_3 \cdot 9H_2O$ | 19.2 g | — | — | — | 7 g |
| $Co(NO_3)_2 \cdot 6H_2O$ | 21 g | 70 g | — | 14.5 g | 58 g |
| $Fe(NO_3)_3 \cdot 9H_2O$ | 38.8 g | — | 97 g | 20 g | 80 g |

The aqueous ammonia is added gradually with stirring to a pH of 9. The precipitate obtained is then filtered off on a Buchner funnel and oven-dried at 110° C. overnight. The precipitates are then dried for at least 12 hours in an oven at 110° C. The powders thus obtained are heat treated in air at a temperature enabling the formation of the perovskite phase, in general between 1000° C. and 1400° C. (A lower temperature would have been possible, but would have led to a perovskite precursor). In the present case, the temperature was 1300° C. After heat treatment, the perovskite content measured by X-ray diffraction on each of the powders was greater than or equal to 90%.

The content of phase of perovskite structure was determined via the method described previously in the present description. By way of example, the determination of the content of perovskite of lanthanum-chromium-cobalt oxide $La(Cr_{0.9}Co_{0.1})O_3$ was performed from the X-ray diffraction diagrams, acquired with a D5000 diffractometer from the company Bruker equipped with a copper DX tube. After synthesis, the products obtained may comprise the perovskite phase and also other phases, in smaller amounts, such as $Cr_2O_3$.

The perovskite phases of the lanthanum-chromium-cobalt oxides are identified, according to the standard protocol, by X-ray diffraction, by means of ICDD (International Center for Diffraction Data) sheets. For example, the sheet ICDD 00-024-1016 is that of the perovskite phase of lanthanum-chromium-cobalt oxide $La(Cr_{0.9}Co_{0.1})O_3$.

In practice, the measurements of the perovskite content of the lanthanum-chromium-cobalt oxides are performed when the X-ray diffraction diagram shows:
- a predominant perovskite phase of lanthanum-chromium-cobalt oxide,
- a secondary phase and optionally other minor phases.

Thus, by means of the EVA software (sold by the company Brüker) and after having subtracted the continuous background (background 0.8), it is possible to measure the area $A_{PER}$ (without deconvolution treatment) of the main diffraction peak or main multiplet diffraction peak of the perovskite phase of lanthanum-chromium-cobalt oxide and the area $A_{secondary phase}$ (without deconvolution treatment) of the main diffraction peak or main multiplet diffraction peak of the secondary phase (in the present case $Cr_2O_3$). The perovskite content of lanthanum-chromium-cobalt oxide is then calculated according to formula (1).

Thus, if the perovskite phase of lanthanum-chromium-cobalt oxide is the only phase present in the X-ray diffraction diagram, the perovskite content is equal to 100%. In the present case, the $La(Cr_{0.9}Co_{0.1})O_3$ perovskite content calculated according to formula (1) is 95%.

The spinel powder $(Co,Fe)(Fe,Cr)_2O_4$ used in examples 13 to 20 is prepared by solid-phase reaction of various nitrates coprecipitated in basic medium with aqueous ammonia. The hydrates used, supplied by Sigma Aldrich, are cobalt nitrate hexahydrate $Co(NO_3)_2.6H_2O$, iron nitrate nonahydrate $Fe(NO_3)_3.9H_2O$ and chromium nitrate nonahydrate $Cr(NO_3)_3.9H_2O$. The hydrates are dissolved in distilled water to a total concentration of 1 mol/l. The masses of the various hydrates introduced are given in table 2 below:

TABLE 2

| | $(Co,Fe)(Fe,Cr)_2O_4$ |
|---|---|
| Distilled water | Remainder to 500 ml |
| $Cr(NO_3)_3.9H_2O$ | 32 g |
| $Co(NO_3)_2.6H_2O$ | 35 g |
| $Fe(NO_3)_3.9H_2O$ | 48.5 g |

The aqueous ammonia is added gradually with stirring to a pH of 9. The precipitate obtained is then filtered through a Buchner funnel and oven-dried at 110° C. overnight. The precipitate is then dried for at least 12 hours in an oven at 110° C. The powder thus obtained is heat treated in air at a temperature of 1200° C. allowing the formation of the spinel phase. After heat treatment, the spinel content measured by X-ray diffraction on this powder was greater than 95%, the determination of the content of phase of spinel structure having been determined via the method described previously in the present description, and calculated according to formula (1).

The $Fe_2O_3$ powder, oxide of hematite structure, used in example 22 is an iron oxide powder $Fe_2O_3$, sold by the company BASF.

The $Mn_2O_3$ powder, oxide of hematite structure, used in example 23 is a manganese oxide powder $Mn_2O_3$, obtained after heat treatment at 800° C. for 2 hours in air of electrolytic-grade $MnO_2$, sold by the company Delta EMD.

The zirconium praseodymium orthosilicate powder $(Zr,Pr)SiO_4$ used in example 24 is a zirconium praseodymium orthosilicate powder, Sicocer F Yellow 2255 grade, sold by the company BASF.

The zirconium orthosilicate powder comprising iron oxide as inclusion, used in example 25, is a zirconium orthosilicate and iron oxide powder, Sicocer F Red 2355 grade, sold by the company BASF.

For each of the examples performed, the powder of pigment of perovskite structure or of pigment of spinel structure or of pigment of hematite structure or of orthosilicate pigment is mixed with an yttrium-toughened zirconia powder and with an alumina powder whose main characteristics are given in table 3, by micromilling of the yttrium-toughened zirconia powder with the alumina powder and with the powder of pigment of perovskite structure or of pigment of spinel structure or of pigment of hematite structure or of orthosilicate pigment.

TABLE 3

| | Yttrium-toughened zirconia powder No. 1 | Yttrium-toughened zirconia powder No. 2 | Alumina powder |
|---|---|---|---|
| $ZrO_2$ (mass %) | Remainder to 100% | Remainder to 100% | — |
| $Y_2O_3$ (mass %) | 5.30 | 5.30 | — |
| $Al_2O_3$ (mass %) | 0.01 | 0.005 | Remainder to 100% |
| $SiO_2$ (ppm) | 100 | 100 | 50 |
| $Na_2O$ (ppm) | 140 | 40 | 100 |
| CaO (ppm) | 30 | 20 | 20 |
| $Fe_2O_3$ (ppm) | 20 | 25 | 20 |
| MgO (ppm) | <20 | <20 | 20 |
| $TiO_2$ (ppm) | <20 | <20 | <20 |
| Specific surface area (m²/g) | 13 | 7 | 7 |
| $d_{10}$ (μm) | 0.1 | 0.2 | 0.1 |
| $d_{50}$ (μm) | 0.25 | 0.35 | 0.4 |
| $d_{90}$ (μm) | 1.1 | 1.2 | 1.0 |

This micromilling is performed in a wet ball mill (zirconia balls containing 3 mol % of $Y_2O_3$, of diameter 0.8 mm) or an attrition mill. The milling conditions used for each mixture are as follows:
- mill volume: 800 ml;
- mass of balls: 2.2 kg;
- volume of demineralized water: 200 ml;
- mass of powder to be micromilled: 50 g.

After micromilling, the powders have a median size, measured by sedigraphy, of 0.25 μm.

The various suspensions are then dried by atomization, with an atomizer inlet temperature of 300° C. and an atomizer outlet temperature of 110° C., the throughput of the suspension being 6 l/h. The powders thus obtained are then screened on a 250 μm screen.

The various particulate mixtures produced are given in table 4 below:

TABLE 4

| Ex. | Yttrium-toughened zirconia powder No. 1 according to table 3 (%) | Yttrium-toughened zirconia powder No. 2 according to table 3 (%) | Alumina powder according to table 3 (%) | Powder of pigment of perovskite structure (%) | Nature of the oxide of perovskite structure | Powder of pigment of spinel structure (%) | Nature of the oxide of spinel structure | Powder of pigment of hematite structure (%) | Nature of the oxide of hematite structure | Powder of orthosilicate pigment (%) | Nature of the orthosilicate oxide |
|---|---|---|---|---|---|---|---|---|---|---|---|
| 1 | 90 | — | 5 | 5 | $La(Co_{0.3}Fe_{0.4}Cr_{0.3})O_3$ | — | — | — | — | — | — |
| 2 | 75 | — | 20 | 5 | $La(Co_{0.3}Fe_{0.4}Cr_{0.3})O_3$ | — | — | — | — | — | — |
| 3 | 90 | — | 5 | 5 | $LaCoO_3$ | — | — | — | — | — | — |
| 4 | 75 | — | 20 | 5 | $LaCoO_3$ | — | — | — | — | — | — |
| 5 | 90 | — | 5 | 5 | $LaFeO_3$ | — | — | — | — | — | — |
| 6 | 75 | — | 20 | 5 | $LaFeO_3$ | — | — | — | — | — | — |
| 7 | 90 | — | 5 | 5 | $La(Co_{0.2}Fe_{0.2}Mn_{0.6})O_3$ | — | — | — | — | — | — |
| 8 | 75 | — | 20 | 5 | $La(Co_{0.2}Fe_{0.2}Mn_{0.6})O_3$ | — | — | — | — | — | — |
| 9 | 90 | — | 5 | 5 | $La(Cr_{0.9}Co_{0.1})O_3$ | — | — | — | — | — | — |
| 10 | 75 | — | 20 | 5 | $La(Cr_{0.9}Co_{0.1})O_3$ | — | — | — | — | — | — |
| 11 | — | 90 | 5 | 5 | $La(Co_{0.3}Fe_{0.4}Cr_{0.3})O_3$ | — | — | — | — | — | — |
| 12 | — | 75 | 20 | 5 | $La(Co_{0.3}Fe_{0.4}Cr_{0.3})O_3$ | — | — | — | — | — | — |
| 13 | 92 | — | 3 | — | — | 5 | $(Co,Fe)(Fe,Cr)_2O_4$ | — | — | — | — |
| 14 | 90 | — | 5 | — | — | 5 | $(Co,Fe)(Fe,Cr)_2O_4$ | — | — | — | — |
| 15 | 84 | — | 10 | — | — | 6 | $(Co,Fe)(Fe,Cr)_2O_4$ | — | — | — | — |
| 16 | 74 | — | 20 | — | — | 6 | $(Co,Fe)(Fe,Cr)_2O_4$ | — | — | — | — |
| 17 | 64 | — | 30 | — | — | 6 | $(Co,Fe)(Fe,Cr)_2O_4$ | — | — | — | — |
| 18 | 44 | — | 50 | — | — | 6 | $(Co,Fe)(Fe,Cr)_2O_4$ | — | — | — | — |
| 19 | — | 90 | 5 | — | — | 5 | $(Co,Fe)(Fe,Cr)_2O_4$ | — | — | — | — |
| 20 | — | 75 | 20 | — | — | 5 | $(Co,Fe)(Fe,Cr)_2O_4$ | — | — | — | — |
| 21 | 65 | — | 20 | 15 | $La(Co_{0.3}Fe_{0.4}Cr_{0.3})O_3$ | — | — | — | — | — | — |
| 22 | 79 | — | 20 | — | — | — | — | 1 | $Fe_2O_3$ | — | — |
| 23 | 78 | — | 20 | — | — | — | — | 2 | $Mn_2O_3$ | — | — |
| 24 | 75 | — | 20 | — | — | — | — | — | — | 5 | $(Zr,Pr)SiO_4$ |
| 25 | 75 | — | 20 | — | — | — | — | — | — | 5 | $Fe:ZrSiO_4$ |

Preforms, in the form of pellets 32 mm in diameter and of mass 8 grams, were made by uniaxial pressing at a pressure of 100 MPa of the particulate mixtures of the examples. Said preforms were then sintered according to the following cycle:
temperature increase to 500° C. at 100° C./hour,
maintenance at 500° C. for 2 hours,
temperature increase up to a temperature T, at 100° C./hour,
maintenance at the temperature T for 2 hours,
temperature decrease by natural cooling.
Table 5 below summarizes the properties of the sintered parts obtained.

TABLE 5

| Particulate mixture according to the example | Temperature T (° C.) | Density (g/cm³) | Resilience (MPa·m^{1/2}) | Hardness (HV10) | L* | a* | b* | Color |
|---|---|---|---|---|---|---|---|---|
| 1 | 1450 | 5.82 | 11 | 1400 | 0.2 | 0.1 | 0.1 | Black |
| 2 | 1450 | 5.38 | 10 | 1800 | 0.4 | 0.2 | 0.2 | Black |
| 3 | 1450 | 5.84 | — | — | 34 | 9 | −50 | Blue |
| 4 | 1450 | 5.40 | — | — | 45 | 7 | −40 | Blue |
| 5 | 1450 | 5.80 | — | — | 50 | 10 | 2 | Red |
| 6 | 1450 | 5.30 | — | — | 65 | 10 | 20 | Orange |
| 7 | 1450 | 5.84 | 10 | 1400 | 0.4 | 0.2 | 0.5 | Black |
| 8 | 1450 | 5.35 | — | — | 1 | 0.5 | 1 | Black |
| 9 | 1450 | 5.84 | 10 | 1400 | 20 | −10 | 20 | Green |
| 10 | 1450 | 5.35 | 9 | 1800 | 40 | −10 | 20 | Green |
| 11 | 1500 | 5.85 | — | — | 0.5 | 0.2 | 0.5 | Black |
| 12 | 1500 | 5.38 | — | — | 0.8 | 0.2 | 0.5 | Black |
| 13 | 1450 | 5.91 | 13 | 1400 | 0.2 | −0.1 | 0.1 | Black |
| 14 | 1450 | 5.85 | 12 | 1450 | 0.2 | −0.1 | 0 | Black |
| 15 | 1450 | 5.74 | | | 0.3 | −0.2 | −0.1 | Black |
| 16 | 1450 | 5.40 | 10 | 1850 | 0.4 | −0.2 | −0.2 | Black |
| 17 | 1450 | 5.15 | 7 | 1900 | 1 | −0.2 | −0.5 | Black |
| 18 | 1450 | 4.64 | 4 | 1950 | 4 | −0.5 | −1.2 | Gray |
| 19 | 1500 | 5.86 | 10 | 1400 | 0.5 | −0.5 | −0.2 | Black |
| 20 | 1500 | 5.40 | — | — | 1 | −1 | −1 | Black |
| 21 | 1450 | 5.35 | 3 | 1550 | 0.4 | 0.1 | 0.1 | Black |
| 22 | 1450 | 5.39 | 9 | 1800 | 45 | 20 | 35 | Orange |
| 23 | 1450 | 5.34 | 8 | 1900 | 70 | 10 | 3 | Violet |

TABLE 5-continued

| Particulate mixture according to the example | Temperature T (° C.) | Density (g/cm³) | Resilience (MPa·m^{1/2}) | Hardness (HV10) | L* | a* | b* | Color |
|---|---|---|---|---|---|---|---|---|
| 24 | 1450 | 5.33 | 7 | 1500 | 80 | −1 | 30 | Yellow |
| 25 | 1450 | 5.32 | 7 | 1500 | 45 | 5 | 20 | Orange |

The zirconia of the sintered parts obtained from the particulate mixtures 1 to 25 consists for more than 95% by volume of the quadratic and/or cubic phase, the remainder to 100% consisting of monoclinic phase. The alumina of the sintered parts obtained from the particulate mixtures 1 to 25 consists for substantially 100% of alpha phase.

Table 5 shows that the sintered parts tested according to the invention have good mechanical properties and are dense.

A comparison of examples 1 and 2, 9 and 10, 13 and 14, and 16 to 18 shows a decrease in the resilience and an increase in the hardness when the alumina content increases, for a constant content of pigment of perovskite structure or for a constant content of pigment of spinel structure.

Example 21, outside the invention, shows that a content of pigment of perovskite structure equal to 15% degrades the resilience to a prohibitive level for an application in which impact strength is necessary.

The sintered parts according to the invention are particularly suitable for use as decorative veneer in articles such as watches, bracelets, brooches, tiepins, necklaces, telephones, items of furniture or household tools such as scissors or knives, and also as lid in a device for communication by radio waves with frequencies of between 800 MHz and 3 GHz, said lid being at least partly exposed to the external environment of the device traversed by at least some of said waves during the use of the device.

Needless to say, the present invention is not limited to the embodiments described and provided as examples.

The invention claimed is:

1. An article chosen from the group formed by an item of jewelry, a watch, a bracelet, a necklace, a ring, a brooch, a tiepin, a handbag, a telephone, an item of furniture and a household tool, a handle, a button, a veneer, a visible part of a consumer goods item, a spectacle frame part, an item of crockery, a frame, a lid of a device for communication by radio waves with frequencies of between 800 MHz and 3 GHz, said lid being at least partly exposed to the external environment of the device and traversed by at least some of said waves during the use of the device, said article comprising a sintered part having the following chemical composition, as mass percentages on the basis of the oxides:

zirconia $ZrO_2 \geq 10.0\%$;

2% to 20.0% of an oxide selected from the group $G_S(1)$ consisting of $Y_2O_3$, $Sc_2O_3$, MgO, CaO, $CeO_2$, and mixtures thereof, the total content of MgO+CaO being less than 5.0%;

10% < $Al_2O_3 \leq 80\%$;

0 to 18.0% of an oxide selected from the group $G_S(2)$ consisting of ZnO, lanthanide oxides with the exception of $CeO_2$, and mixtures thereof;

less than 12.0% of other oxides;

said sintered part comprising 0.5% to 10.0% of a pigment made of a material chosen from oxide(s) of perovskite structure $ABO_3$,
oxides of spinel structure,
oxides of hematite structure $E_2O_3$, the element E being selected from the group $G_E(1)$ consisting of mixtures of aluminum and chromium, mixtures of aluminum and manganese, and mixtures thereof, oxides of rutile structure $FO_2$, the element F being selected from the group $G_F(1)$ consisting of mixtures of tin and vanadium, mixtures of titanium and chromium and niobium, mixtures of titanium and chromium and tungsten, mixtures of titanium and niobium and manganese, mixtures of tin and chromium, and mixtures thereof, orthosilicates selected from the group consisting of zirconium praseodymium orthosilicates $(Zr,Pr)SiO_4$, zirconium vanadium orthosilicates $(Zr,V)SiO_4$, and zirconium orthosilicates comprising iron oxide as inclusion, and mixtures thereof; and said sintered part being obtained from a particulate mixture which has a median size of less than 10 μm.

2. The article as claimed in claim 1, in which the oxide of perovskite structure $ABO_3$ is such that the element A at the site A of the perovskite structure of said oxide is selected from the group $G_A(1)$ consisting of calcium, strontium, barium, lanthanum, praseodymium, neodymium, bismuth, cerium, and mixtures thereof; and the element B at the site B of the perovskite structure of said oxide is selected from the group $G_B(1)$ consisting of mixtures of cobalt and iron, mixtures of cobalt and manganese, mixtures of cobalt and chromium, mixtures of cobalt and nickel, mixtures of chromium and manganese, mixtures of chromium and nickel, mixtures of chromium and iron, mixtures of manganese and iron, mixtures of manganese and nickel, mixtures of nickel and iron, mixtures of cobalt and titanium, mixtures of cobalt and copper, cobalt, mixtures of chromium and titanium, mixtures of chromium and copper, mixtures of nickel and titanium, chromium, nickel, copper, iron, mixtures of nickel and copper, and mixtures thereof; and/or the oxide of spinel structure $CD_2O_4$ or $D(C,D)O_4$ is such that the element C of the spinel structure is selected from the group $G_C(1)$ consisting of nickel Ni in a mole fraction of between 0 and 0.2 or in a mole fraction equal to 1, copper Cu in a mole fraction of between 0 and 0.2, iron Fe in a mole fraction of between 0.2 and 0.6 or in a mole fraction equal to 1, zinc Zn in a mole fraction of between 0 and 0.2 or in a mole fraction equal to 1, manganese Mn in a mole fraction of between 0 and 0.4, cobalt Co in a mole fraction of between 0 and 0.4 or in a mole fraction of between 0.4 and 1, tin Sn in a mole fraction of between 0 and 0.2 or in a mole fraction equal to 1, mixtures of zinc and iron, mixtures of iron and manganese, mixtures of zinc and manganese, mixtures of cobalt and zinc, and mixtures thereof; the percentage by weight of alumina in the sintered part being greater than 10%, and the element D of the spinel structure is selected from the group $G_D(1)$ consisting of manganese Mn in a mole fraction of between 0 and 0.4, iron Fe in a mole fraction of between 0 and 0.6 or in a mole fraction equal to 1, chromium Cr in a mole fraction of between 0.2 and 0.6 or in a mole fraction equal to 1, aluminum Al in a mole fraction of between 0 and 1, titanium Ti in a mole fraction of between 0 and 1, cobalt in a mole fraction equal to 1 unless the element C is cobalt, mixtures of iron and chromium, mixtures of iron and chromium and manganese, mixtures of manganese and chromium, mixtures of aluminum and chromium, and mixtures thereof.

3. The article as claimed in claim 2, in which
the oxide of perovskite structure $ABO_3$ is such that
   the element A at the site A of the perovskite structure of said oxide is selected from the group $G_A(2)$ consisting of lanthanum, praseodymium, neodymium, bismuth, cerium, and mixtures thereof; and
   the element B at the site B of the perovskite structure of said oxide is selected from the group $G_B(2)$ consisting of mixtures of cobalt and iron, mixtures of cobalt and manganese, mixtures of chromium and manganese, mixtures of chromium and iron, mixtures of cobalt and chromium and iron, mixtures of cobalt and chromium and iron and manganese, mixtures of cobalt and iron and manganese, mixtures of cobalt and chromium, mixtures of cobalt and nickel, mixtures of cobalt and titanium, mixtures of cobalt and copper, cobalt, mixtures of chromium and nickel, mixtures of chromium and titanium, mixtures of chromium and copper, mixtures of chromium and iron and manganese, mixtures of nickel and iron, mixtures of nickel and manganese, mixtures of nickel and cobalt, mixtures of nickel and titanium, mixtures of nickel and cobalt and chromium, mixtures of nickel and cobalt and chromium and manganese, mixtures of nickel and chromium and manganese, chromium, nickel, copper; and/or
the oxide of spinel structure $CD_2O_4$ or $D(C,D)O_4$ is such that
   the element C of the spinel structure is selected from the group $G_C(2)$ consisting of nickel Ni in a mole fraction of between 0 and 0.2 or in a mole fraction equal to 1, iron Fe in a mole fraction of between 0.2 and 0.6 or in a mole fraction equal to 1, zinc Zn in a mole fraction equal to 1, manganese Mn in a mole fraction of between 0 and 0.4, cobalt Co in a mole fraction of between 0 and 0.4 or in a mole fraction of between 0.4 and 1, tin Sn in a mole fraction of between 0 and 0.2 or in a mole fraction equal to 1, mixtures of zinc and iron, mixtures of iron and manganese, mixtures of zinc and manganese, mixtures of cobalt and zinc, and mixtures thereof, and
   the element D of spinel structure is selected from the group $G_D(2)$ consisting of manganese Mn in a mole fraction of between 0 and 0.4, iron Fe in a mole fraction of between 0.2 and 0.6 or in a mole fraction equal to 1, chromium Cr in a mole fraction of between 0 and 0.6 or in a mole fraction equal to 1, aluminum Al in a mole fraction equal to 1, titanium Ti in a mole fraction equal to 1, cobalt in a mole fraction equal to 1 unless the element C is cobalt, mixtures of iron and chromium, mixtures of iron and chromium and manganese, mixtures of manganese and chromium, mixtures of aluminum and chromium, and mixtures thereof.

4. The article as claimed in claim 1, in which the element A at the site A of the perovskite structure is lanthanum.

5. The article as claimed in claim 1, in which the oxide of spinel structure $CD_2O_4$ or $D(C,D)O_4$ is such that Ni is present in a mole fraction of between 0 and 0.2.

6. The article as claimed in claim 1, in which the pigment is chosen from
   the oxides of perovskite structure $ABO_3$ such that
      the element A at the site A of the perovskite structure is selected from the group $G_A'(1)$ consisting of calcium Ca, strontium Sr, barium Ba, lanthanum La, praseodymium Pr, neodymium Nd, bismuth Bi, cerium Ce, and mixtures thereof, and
      the element B at the site B of the perovskite structure is selected from the group $G_B'(1)$ consisting of mixtures of cobalt and iron $Co_xFe_{1-x}$, with x between 0.2 and 0.4, mixtures of cobalt and manganese $Co_xMn_{1-x}$, with x between 0.2 and 0.4, mixtures of chromium and manganese $Cr_xMn_{1-x}$, with x between 0.2 and 0.4, mixtures of chromium and iron $Cr_xFe_{1-x}$, with x between 0.3 and 0.5, mixtures of manganese and iron $Mn_xFe_{1-x}$, with x between 0.4 and 0.7, mixtures of nickel and iron $Ni_xFe_{1-x}$, with x between 0.4 and 0.7, and mixtures thereof, and/or
   the oxides of spinel structure $CD_2O_4$ or $D(C,D)O_4$ such that
      the element C is selected from the group $G_C'(1)$ consisting of nickel Ni in a mole fraction of between 0 and 0.2, copper Cu in a mole fraction of between 0 and 0.2, iron Fe in a mole fraction of between 0.2 and 0.6, zinc Zn in a mole fraction of between 0 and 0.2, manganese Mn in a mole fraction of between 0 and 0.4, cobalt Co in a mole fraction of between 0 and 0.4, and mixtures thereof, and
      the element D is selected from the group $G_D'(1)$ consisting of manganese Mn in a mole fraction of between 0 and 0.4, iron Fe in a mole fraction of between 0.2 and 0.6, chromium Cr in a mole fraction of between 0.2 and 0.6, aluminum Al in a mole fraction of between 0 and 0.4, titanium Ti in a mole fraction of between 0 and 0.4, and mixtures thereof.

7. The article as claimed in claim 6, in which the material of the particles of said pigment is chosen from
   the oxides of perovskite structure $ABO_3$ such that
      the element A at the site A of the perovskite structure is selected from the group $G_A'(2)$ consisting of lanthanum, praseodymium, neodymium, bismuth, cerium, and mixtures thereof, and
      the element B at the site B of the perovskite structure is selected from the group $G_B'(2)$ consisting of mixtures of cobalt and chromium and iron $Co_xCr_yFe_z$, with x between 0.1 and 0.3, y between 0.1 and 0.3 and z between 0.4 and 0.8 and x+y+z=1, mixtures of cobalt and chromium and iron and manganese $Co_xCr_yFe_zMn_t$, with x between 0.1 and 0.2, y between 0.1 and 0.2, z between 0.3 and 0.5 and t between 0.3 and 0.5 and x+y+z+t=1, mixtures of cobalt and iron and manganese $Co_xFe_yMn_z$, with x between 0.1 and 0.3, y between 0.4 and 0.6 and z between 0.4 and 0.5 and x+y+z=1,
   the oxides of spinel structure $CD_2O_4$ or $D(C,D)O_4$ such that
      the element C is selected from the group $G_C'(2)$ consisting of nickel Ni in a mole fraction of between 0 and 0.2, iron Fe in a mole fraction of between 0.2 and 0.6, manganese Mn in a mole fraction of between 0 and 0.4, cobalt Co in a mole fraction of between 0 and 0.4, and mixtures thereof, and the element D is selected from the group $G_D'(2)$ consisting of manganese Mn in a mole fraction of between 0 and 0.4, iron Fe in a mole fraction of between 0.2 and 0.6, chromium Cr in a mole fraction of between 0.2 and 0.6, and mixtures thereof.

8. The article as claimed in claim 6, in which said sintered part was obtained from a particulate mixture in which:

the amount of oxides of perovskite structure and/or of precursor(s) of such oxides is greater than 3% if the amount of alumina in said particulate mixture is less than 10%, and/or greater than 4% if the amount of alumina in said particulate mixture is less than 20%, and/or greater than 5% if the amount of alumina in said particulate mixture is less than 80%, and/or less than 8%, or the amount of oxides of spinel structure is greater than 3%.

9. The article as claimed in claim 5, in which said sintered part was obtained from a particulate mixture in which the amount of oxides of perovskite structure and/or of precursor(s) of such oxides is less than 3% if the amount of alumina in the particulate mixture is between 2% and 10%, and/or less than 4% if the amount of alumina in the particulate mixture is between 10% and 20%, and/or less than 5% if the amount of alumina in the particulate mixture is between 20% and 80%, or the amount of oxides of spinel structure is less than 3%.

10. The article as claimed in claim 1, in which the material of the particles of said pigment is chosen from the oxides of perovskite structure $ABO_3$ such that the element A at the site A of the perovskite structure is selected from the group $G_A''(1)$ consisting of calcium Ca, strontium Sr, barium Ba, lanthanum La, praseodymium Pr, neodymium Nd, bismuth Bi, cerium Ce, and mixtures thereof, and the element B at the site B of the perovskite structure is selected from the group $G_B''(1)$ consisting of mixtures of cobalt and iron $Co_xFe_{1-x}$, with x between 0.5 and 0.95, mixtures of cobalt and manganese $Co_xMn_{1-x}$, with x between 0.5 and 0.95, mixtures of cobalt and chromium $Co_xCr_{1-x}$, with x between 0.5 and 0.95, mixtures of cobalt and nickel $Co_xNi_{1-x}$, with x between 0.5 and 0.95, mixtures of cobalt and titanium $Co_xTi_{1-x}$, with x between 0.5 and 0.95, mixtures of cobalt and copper $Co_xCu_{1-x}$, with x between 0.5 and 0.95, cobalt, and mixtures thereof, the oxides of spinel structure $CD_2O_4$ or $D(C,D)O_4$ such that the element C is selected from the group $G_C''(1)$ consisting of nickel Ni in a mole fraction of between 0 and 0.2, zinc Zn in a mole fraction of between 0 and 0.2, cobalt Co in a mole fraction of between 0.4 and 1, tin Sn in a mole fraction of between 0 and 0.2 and in a mole fraction equal to 1, mixtures of cobalt and zinc, and mixtures thereof, and the element D is selected from the group $G_D''(1)$ consisting of chromium Cr in a mole fraction of between 0 and 0.4, aluminum Al in a mole fraction of between 0 and 1, titanium Ti in a mole fraction of between 0 and 1, cobalt in a mole fraction equal to 1 unless the element C is cobalt, mixtures of aluminum and chromium, and mixtures thereof, zirconium vanadium orthosilicates $(Zr,V)SiO_4$.

11. The article as claimed in claim 10, in which the material of the particles of said pigment is chosen from the oxides of perovskite structure $ABO_3$ such that the element A at the site A of the perovskite structure is selected from the group $G_A''(2)$ consisting of lanthanum, praseodymium, neodymium, bismuth, cerium, and mixtures thereof, and the element B at the site B of the perovskite structure is selected from the group $G_B''(2)$ consisting of mixtures of cobalt and iron $Co_xFe_{1-x}$, with x between 0.8 and 0.95, mixtures of cobalt and manganese $Co_xMn_{1-x}$, with x between 0.8 and 0.95, mixtures of cobalt and chromium $Co_xCr_{1-x}$, with x between 0.8 and 0.95, mixtures of cobalt and nickel $Co_xNi_{1-x}$, with x between 0.8 and 0.95, mixtures of cobalt and titanium $Co_xTi_{1-x}$, with x between 0.8 and 0.95, mixtures of cobalt and copper $Co_xCu_{1-x}$, with x between 0.8 and 0.95, cobalt, mixtures of cobalt and chromium and iron $Co_xCr_yFe_z$, with x between 0.5 and 0.8, y between 0.1 and 0.4 and z between 0.1 and 0.4 and x+y+z=1, mixtures of cobalt and chromium and iron and manganese $Co_xCr_yFe_zMn_t$, with x between 0.5 and 0.7, y between 0.1 and 0.3, z between 0.1 and 0.3 and t between 0.1 and 0.3 and x+y+z+t=1, mixtures of cobalt and iron and manganese $Co_xFe_yMn_z$, with x between 0.5 and 1, y between 0.1 and 0.4 and z between 0.1 and 0.4 and x+y+z=1, and/or the oxides of spinel structure $CD_2O_4$ or $D(C,D)O_4$ such that the element C is selected from the group $G_C''(2)$ consisting of cobalt Co in a mole fraction equal to 1, tin Sn in a mole fraction equal to 1, mixtures of cobalt and zinc, and mixtures thereof, and the element D is selected from the group $G_D''(2)$ consisting of aluminum Al in a mole fraction equal to 1, cobalt in a mole fraction equal to 1 unless the element C is cobalt, mixtures of aluminum and chromium, and mixtures thereof.

12. The article as claimed in claim 11, in which the oxide of spinel structure is selected from the group consisting of $Co_2SnO_4$, $CoAl_2O_4$, $Co(Cr,Al)_2O_4$, $(Co,Zn)Al_2O_4$ and mixtures thereof.

13. The article as claimed in claim 1, in which the material of the particles of said pigment is chosen from the oxides of perovskite structure $ABO_3$ such that the element A at the site A of the perovskite structure is selected from the group $G_A'''(1)$ consisting of calcium Ca, strontium Sr, barium Ba, lanthanum La, praseodymium Pr, neodymium Nd, bismuth Bi, cerium Ce, and mixtures thereof, and the element B at the site B of the perovskite structure is selected from the group $G_B'''(1)$ consisting of mixtures of chromium and iron $Cr_xFe_{1-x}$, with x between 0.5 and 0.95, mixtures of chromium and manganese $Cr_xMn_{1-x}$, with x between 0.5 and 0.95, mixtures of chromium and cobalt $Cr_xCo_{1-x}$, with x between 0.5 and 0.95, mixtures of chromium and nickel $Cr_xNi_{1-x}$, with x between 0.5 and 0.95, mixtures of chromium and titanium $Cr_xTi_{1-x}$, with x between 0.5 and 0.95, mixtures of chromium and copper $Cr_xCu_{1-x}$, with x between 0.5 and 0.95, mixtures of nickel and iron $Ni_xFe_{1-x}$, with x between 0.5 and 0.95, mixtures of nickel and manganese $Ni_xMn_{1-x}$, with x between 0.5 and 0.95, mixtures of nickel and cobalt $Ni_xCo_{1-x}$, with x between 0.5 and 0.95, mixtures of nickel and titanium $Ni_xTi_{1-x}$, with x between 0.5 and 0.95, chromium, nickel, and mixtures thereof, the oxides of spinel structure $CD_2O_4$ or $D(C,D)O_4$ selected from the group consisting of $CoCr_2O_4$, $TiCo_2O_4$, and mixtures thereof.

14. The article as claimed in claim 13, in which the oxides of perovskite structure $ABO_3$ are such that the element A at the site A of the perovskite structure is selected from the group $G_A'''(2)$ consisting of lanthanum, praseodymium, neodymium, bismuth, cerium, and mixtures thereof, and the element B at the site B of the perovskite structure is selected from the group $G_B'''(2)$ consisting of mixtures of chromium and iron $Cr_xFe_{1-x}$, with x between 0.8 and 0.95, mixtures of chromium and manganese $Cr_xMn_{1-x}$, with x between 0.8 and 0.95, mixtures of chromium and cobalt $Cr_xCo_{1-x}$, with x between 0.8 and 0.95, mixtures of chromium and nickel $Cr_xNi_{1-x}$, with x between 0.8 and 0.95, mixtures of chromium and titanium $Cr_xTi_{1-x}$, with x between 0.8 and 0.95, mixtures of chromium and copper $Cr_xCu_{1-x}$, with x between 0.8 and 0.95, mixtures of chromium and cobalt and iron $Cr_xCo_yFe_z$, with x between 0.5 and 0.7, y between 0.2 and 0.4 and z between 0.1 and 0.3 and x+y+z=1, mixtures of chromium and cobalt and iron and manganese $Cr_xCo_yFe_zMn_t$, with x between 0.5 and 0.6, y between 0.2 and 0.3, z between 0.1 and 0.3 and t between 0.1 and 0.3 and x+y+z+t=1, mixtures of chromium and iron and manganese $Cr_xFe_yMn_z$, with x between 0.6 and 0.8, y between 0.1 and 0.3 and z between 0.1 and 0.4 and x+y+z=1, mixtures of nickel and iron $Ni_xFe_{1-x}$, with x between 0.8 and 0.95, mixtures of nickel and manganese $Ni_xMn_{1-x}$, with x between 0.8 and 0.95, mixtures of nickel and cobalt $Ni_xCo_{1-x}$, with x between 0.8 and 0.95, mixtures of nickel and titanium $Ni_xTi_{1-x}$, with x between 0.8 and 0.95, mixtures of nickel and cobalt and chromium $Ni_xCo_yCr_z$, with x between 0.5 and 0.8, y between 0.1 and 0.4, z between 0.1 and 0.4 and x+y+z=1, mixtures of nickel and cobalt and chromium and manganese $Ni_xCo_yCr_zMn_t$, with x between 0.5 and 0.7, y between 0.1 and 0.3, z between 0.1 and 0.3 and t between 0.1 and 0.3 and x+y+z+t=1, mixtures of nickel and chromium and manganese $Ni_xCr_yMn_z$, with x between 0.5 and 0.8, y between 0.1 and 0.4, z between 0.1 and 0.4 and x+y+z=1, chromium and nickel.

15. The article as claimed in claim 1, in which the material of the particles of said pigment is chosen from the oxides of perovskite structure $ABO_3$ such that the element A at the site A of the perovskite structure is selected from the group $G_A^{4\prime}(1)$ consisting of calcium Ca, strontium Sr, barium Ba, lanthanum La, praseodymium Pr, neodymium Nd, bismuth Bi, cerium Ce, and mixtures thereof, and the element B at the site B of the perovskite structure is selected from the group $G_B^{4\prime}(1)$ consisting of mixtures of chromium and cobalt $Cr_xCo_{1-x}$, with x between 0.3 and 0.8, mixtures of nickel and cobalt $Ni_xCo_{1-x}$, with x between 0.3 and 0.8, mixtures of chromium and copper $Cr_xCu_{1-x}$, with x between 0.3 and 0.8, mixtures of nickel and copper $Ni_xCu_{1-x}$, with x between 0.3 and 0.8, mixtures of nickel and titanium $Ni_xTi_{1-x}$, with x between 0.3 and 0.8, copper, and mixtures thereof.

16. The article as claimed in claim 15, in which the material of the particles of said pigment is chosen from the oxides of perovskite structure $ABO_3$ such that the element A at the site A of the perovskite structure is selected from the group $G_A^{4\prime}(2)$ consisting of lanthanum, praseodymium, neodymium, bismuth, cerium, and mixtures thereof, and the element B at the site B of the perovskite structure is selected from the group $G_B^{4\prime}(2)$ consisting of mixtures of chromium and cobalt $Cr_xCo_{1-x}$, with x between 0.4 and 0.6, mixtures of nickel and cobalt $Ni_xCo_{1-x}$, with x between 0.4 and 0.6, mixtures of nickel and cobalt and chromium $Ni_xCo_yCr_z$, with x between 0.2 and 0.3, y between 0.4 and 0.6 and z between 0.2 and 0.3 and x+y+z=1, and copper.

17. The article as claimed in claim 1, in which the material of the particles of said pigment is chosen from the oxides of perovskite structure $ABO_3$ such that the element A at the site A of the perovskite structure is selected from the group $G_A^{5\prime}(1)$ consisting of calcium Ca, strontium Sr, barium Ba, lanthanum La, praseodymium Pr, neodymium Nd, bismuth Bi, cerium Ce, and mixtures thereof, and the element B at the site B of the perovskite structure is selected from the group $G_B^{5\prime}(1)$ consisting of iron, the oxides of rutile structure $FO_2$ such that F is selected from the group $G_F'(1)$ consisting of mixtures of titanium and chromium and niobium, mixtures of titanium and chromium and tungsten, and mixtures thereof.

18. The article as claimed in claim 17, in which the material of the particles of said pigment is chosen from the oxides of perovskite structure $ABO_3$ such that the element A at the site A of the perovskite structure is selected from the group $G_A^{5\prime}(2)$ consisting of lanthanum, praseodymium, bismuth, cerium, and mixtures thereof.

19. The article as claimed in claim 1, in which the material of the particles of said pigment is chosen from the oxides of perovskite structure $ABO_3$ such that the element A at the site A of the perovskite structure is selected from the group $G_A^{6\prime}(1)$ consisting of calcium Ca, strontium Sr, barium Ba, lanthanum La, praseodymium Pr, neodymium Nd, bismuth Bi, cerium Ce, and mixtures thereof, and the element B at the site B of the perovskite structure is selected from the group $G_B^{6\prime}(1)$ consisting of mixtures of chromium and iron $Cr_xFe_{1-x}$, with x between 0.05 and 0.5, mixtures of nickel and iron $Ni_xFe_{1-x}$, with x between 0.05 and 0.5, mixtures of manganese and iron $Mn_xFe_{1-x}$, with x between 0.05 and 0.5, and mixtures thereof, and/or the oxides of spinel structure $CD_2O_4$ or $D(C,D)O_4$ selected from the group consisting of $Fe(Fe,Cr)_2O_4$, $Fe_2TiO_4$, $NiFe_2O_4$, $(Zn,Fe)Fe_2O_4$, $(Fe,Mn)(Fe,Mn,Cr)_2O_4$, $(Zn,Mn)(Mn,Cr)_2O_4$ and mixtures thereof, and/or the oxides of rutile structure $FO_2$ such that F is selected from the group $G_F''(1)$ consisting of mixtures of titanium and niobium and manganese.

20. The article as claimed in claim 19, in which the material of the particles of said pigment is chosen from the oxides of perovskite structure $ABO_3$ such that the element A at the site A of the perovskite structure is selected from the group $G_A^{6\prime}(2)$ consisting of lanthanum, praseodymium, neodymium, bismuth, cerium, and mixtures thereof.

21. The article as claimed in claim 1, in which the material of the particles of said pigment is chosen from the oxides of spinel structure $CD_2O_4$ or $D(C,D)O_4$ such that the element C is zinc Zn, and the element D is a mixture of aluminum and chromium, and/or the oxides of hematite structure $E_2O_3$ such that the element E at the site E of the hematite structure is selected from the group $G_E(1)$ consisting of mixtures of aluminum and chromium, of aluminum and manganese, and/or the oxides of rutile structure $FO_2$ such that F is selected from the group $G_F'''(1)$ consisting of mixtures of tin and chromium, and/or the zirconium orthosilicates comprising iron oxide as inclusion.

22. The article as claimed in claim 1, in which the material of the particles of said pigment is chosen from the oxides of perovskite structure $ABO_3$ such that the element A at the site A of the perovskite structure is selected from the group $G_A^{7t}(1)$ consisting of calcium Ca, strontium Sr, barium Ba, lanthanum La, praseodymium Pr, neodymium Nd, bismuth Bi, cerium Ce, and mixtures thereof, and the element B at the site B of the perovskite structure is selected from the group $G_B^{7t}(1)$ consisting of mixtures of cobalt and manganese $Co_x Mn_{1-x}$, with x between 0.05 and 0.2.

23. The article as claimed in claim 22, in which the material of the particles of said pigment is chosen from the oxides of perovskite structure $ABO_3$ such that the element A at the site A of the perovskite structure is selected from the group $G_A^{7t}(2)$ consisting of lanthanum, neodymium, and mixtures thereof.

24. The article as claimed in claim 1, in which the material of the particles of said pigment is chosen from the oxides of rutile structure $FO_2$ such that F is selected from the group $G_F^{4t}(1)$ consisting of mixtures of tin and vanadium, and/or the zirconium praseodymium orthosilicates $(Zr,Pr)SiO_4$.

25. The article as claimed in claim 10, in which said sintered part was obtained from a particulate mixture in which the amount of oxides of perovskite structure and/or of precursor(s) of such oxides is greater than 3% if the amount of alumina in said particulate mixture is less than 10%, and/or greater than 4% if the amount of alumina in said particulate mixture is less than 20%, and/or greater than 5% if the amount of alumina in said particulate mixture is less than 80%, and/or less than 8%.

26. The article as claimed in claim 10, in which said sintered part was obtained from a particulate mixture in which the amount of oxides of perovskite structure and/or of precursor(s) of such oxides is less than 3% if the amount of alumina in the particulate mixture is between 2% and 10%, and/or less than 4% if the amount of alumina in the particulate mixture is between 10% and 20%, and/or less than 5% if the amount of alumina in the particulate mixture is between 20% and 80%.

27. The article as claimed in claim 1, in which the oxide of the group $G_S(1)$ is selected from the group consisting of $Y_2O_3$, $CeO_2$ and mixtures thereof.

28. The article as claimed in claim 27, in which $10\% \leq 3.Y_2O_3 + CeO_2 \leq 20\%$.

29. The article as claimed in claim 28, in which $10\% \leq 3.Y_2O_3 + CeO_2 \leq 20\%$, on the basis of the sum of $ZrO_2$, $Y_2O_3$, $Sc_2O_3$, MgO, CaO and $CeO_2$.

30. The article as claimed in claim 1, in which the oxide of the group $G_S(1)$ is $Y_2O_3$, the $Y_2O_3$ content being greater than 3% and less than 8%, on the basis of the sum of $ZrO_2$, $Y_2O_3$, $Sc_2O_3$, MgO, CaO and $CeO_2$.

31. The article as claimed in claim 1, in which said sintered part is obtained from a particulate mixture which has a median size of less than 1 µm.

32. The article as claimed in claim 1, in which said sintered part has a density of greater than 98% of the theoretical density.

33. The article as claimed in claim 1, in which the zirconia of said sintered part consists for more than 80% by volume of quadratic and/or cubic phase, the remainder to 100% consisting of monoclinic phase.

34. The article as claimed in claim 1, in which said sintered part has a surface whose roughness Ra is less than 0.05 µm, or is between 0.1 and 0.5 µm.

35. The article as claimed in claim 1, comprising a support onto which the sintered part is bonded, clipped, sewn or force-fitted.

36. The article as claimed in claim 1, comprising several of said sintered parts, the values of L*, and/or a* and/or b* measured on a first of said sintered parts differing by less than 10% from the corresponding values measured on a second of said sintered parts.

37. A process for manufacturing a decorative article as claimed in claim 1, comprising the following steps:
  i) preparation of a support;
  ii) preparation of a sintered part via a process comprising the following steps:
    a) mixing starting materials to form a starting feedstock;
    b) forming a preform, or "raw part", from said starting feedstock;
    c) sintering said preform at a temperature between 1200° C. and 1500° C. so as to obtain a sintered part;
    the starting feedstock being determined as a function of a desired color for said sintered part;
  iii) optionally, checking the color of said sintered part, preferably by measuring at least one, preferably all, of the following parameters: L*, a* and b*;
  iv) fixing, rigidly or removably, the sintered part onto the support so as to constitute a decorative article;
  v) optionally, wrapping the decorative article.

38. The process as claimed in claim 37, comprising a step d) of polishing said sintered part until the surface roughness Ra of said sintered part is less than 0.05 µm, preferably less than 0.02 µm, more preferably less than 0.01 µm.

39. The process as claimed in claim 37, comprising a step e) of preparing a new starting feedstock which is adapted, as a function of the results of an operation for checking the color of said sintered part, so as to reduce the difference between a desired color and the color of the sintered parts that may be subsequently manufactured from said new starting feedstock.

40. The process as claimed in claim 39, in which the new starting feedstock is adapted such that the index ΔE is less than 5, preferably less than 2, preferably less than 1, the index ΔE being the mean quadratic difference between the parameters L*, a* and b* measured on the sintered parts manufactured from said starting feedstock and the corresponding parameters of the desired color.

41. The article as claimed in claim 1, in which said sintered part was obtained from a particulate mixture which does not contain any pigment containing the element aluminum.

* * * * *